United States Patent [19]

Takada et al.

[11] Patent Number: 4,526,772

[45] Date of Patent: Jul. 2, 1985

[54] BASIC ALUMINUM SULFATE AND PROCESS FOR PRODUCTION THEREOF

[75] Inventors: Kazuya Takada, Sagamihara; Shigeyuki Toyama, Yokohama; Yoshihiko Numata, Sagamihara, all of Japan

[73] Assignee: Tokuyama Suda Kabushiki Kaisha, Yamaguchi, Japan

[21] Appl. No.: 375,769

[22] Filed: May 6, 1982

[30] Foreign Application Priority Data

May 14, 1981 [JP] Japan .................................. 56-71399
Nov. 30, 1981 [JP] Japan ................................ 56-190774
Feb. 12, 1982 [JP] Japan .................................. 57-19811

[51] Int. Cl.$^3$ ............................ C01F 7/74; C01F 7/02
[52] U.S. Cl. ..................................... 423/556; 423/625; 423/629; 423/128
[58] Field of Search ............... 210/716; 423/156, 128, 423/129, 130, 132, 625, 629, 556

[56] References Cited

U.S. PATENT DOCUMENTS

| | | | |
|---|---|---|---|
| 1,986,091 | 1/1935 | Wood | 423/128 |
| 3,929,666 | 12/1975 | Aiba et al. | 423/556 |
| 4,098,883 | 7/1978 | Madaus et al. | 423/556 |
| 4,105,466 | 8/1978 | Kunkle et al. | 106/309 |
| 4,238,347 | 12/1980 | Gancy et al. | 423/629 |
| 4,337,228 | 6/1982 | Garrett, Jr. | 423/556 |

FOREIGN PATENT DOCUMENTS

| | | | |
|---|---|---|---|
| 2547695 | 4/1976 | Fed. Rep. of Germany | 423/556 |
| 2289447 | 5/1976 | France | 423/556 |
| 38-1354 | 2/1963 | Japan | 423/629 |
| 49-40553 | 11/1974 | Japan | 210/716 |
| 7607782 | 8/1981 | Sweden | 423/556 |

*Primary Examiner*—Gary P. Straub
*Attorney, Agent, or Firm*—Sherman & Shalloway

[57] ABSTRACT

A process for producing basic aluminum sulfate of the general formula $$Al(OH)_a(SO_4)_b \cdot nH_2O$$

wherein a, b and n are positive numbers satisfying $a+2b=3$, $2.30 \leq a \leq 2.56$, $0.22 \leq b \leq 0.35$ and $0 \leq n \leq 10$, which comprises reacting a water-soluble basic aluminum salt of the general formula $$Al(OH)_c X_d$$

wherein X represents a monovalent anion, and c and d are positive numbers satisfying $c+d=3$ and $0.5 \leq c \leq 2.55$, with a water-soluble sulfuric acid salt in an aqueous medium at a temperature of less than 90° C. This process gives novel basic aluminum sulfate which is either fibrous, spherical or prismatic depending upon the reaction conditions.

5 Claims, 26 Drawing Figures

BASIC ALUMINUM SULFATE AND PROCESS FOR PRODUCTION THEREOF

BACKGROUND OF THE INVENTION

1. Field of the Invention

This invention relates to a process for producing basic aluminum sulfate, and to novel basic aluminum sulfate in the form of fibers, spheres or prisms.

2. Brief Description of the Prior Art

There have been known various kinds of basic aluminum salts which are in three known forms, crystals, a gel and a sol, and these aluminum salts have found application as industrial materials, for example intermediate raw materials for alumina. Naturally occurring minerals, such as Basaluminite [$Al(OH)_{2.50}(SO_4)_{0.25} \cdot 1.25H_2O$], Paraluminite [$Al(OH)_{2.50}(SO_4)_{0.25} \cdot 2.5H_2O$], Hydrobasaluminite [$Al(OH)_{2.50}(SO_4)_{0.25} \cdot 9H_2O$] and Metabasaluminite [$Al(OH)_{2.50}(SO_4)_{0.25}$], are also known, and it is known that several kinds of basic aluminum sulfate having similar compositions but different forms and crystal structures exist.

It has, of course, been known heretofore to produce basic aluminum sulfate directly by partially neutralizing aluminum sulfate with an alkali. The resulting basic aluminum sulfate, however, tends to be in the form of a sol of gel.

SUMMARY OF THE INVENTION

We have now found that basic aluminum sulfate having different forms from conventional sols or gels can be obtained by adding an alkali to an aluminum salt of a monovalent anion to prepare a water-soluble basic aluminum salt of the monovalent ion and reacting it with a sulfuric acid salt, and that basic aluminum sulfate obtained by this method has a novel combination of composition, form and X-ray diffractometric properties, and is industrially useful.

It is an object of this invention therefore to provide a process for industrially advantageously producing basic aluminum sulfate in forms which are different from sols or gels and are easy to handle.

Another object of this invention is to provide basic aluminum sulfate having a novel combination of composition, form and X-ray diffractometric properties and many industrial applications, and a process for its production.

Still another object of this invention is to provide a process for producing the aforesaid basic aluminum sulfate in a high purity.

According to this invention, there is provided a process for producing basic aluminum sulfate of the general formula

$$Al(OH)_a(SO_4)_b \cdot nH_2O \qquad (1)$$

wherein a, b and n are positive numbers satisfying $a+2b=3$, $2.30 \leq a \leq 2.56$, $0.22 \leq b \leq 0.35$ and $0 \leq n \leq 10$, which comprises reacting a water-soluble basic aluminum salt of the general formula

$$Al(OH)_c X_d \qquad (2)$$

wherein X represents a monovalent anion, and c and d are positive numbers satisfying $c+d=3$ and $0.5 \leq c \leq 2.55$, with a water-soluble sulfuric acid salt in an aqueous medium at a temperature of less than 90° C.

DETAILED DESCRIPTION OF THE PREFERRED EMBODIMENTS

Figure 1:
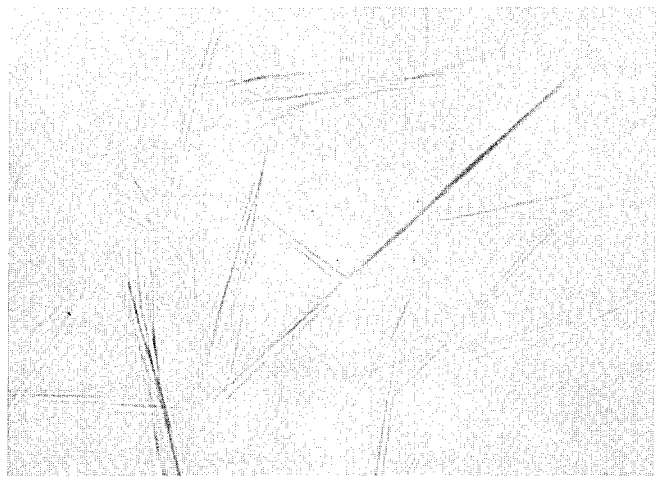
FIG. 1 is an optical microphotograph (magnification 750×) of the suspension of fibrous basic aluminum sulfate obtained in Example 1 of this application.

The important characteristic of the process of this invention lies in the fact that a water-soluble basic aluminum salt of a monovalent ion, as represented by the general formula (1), is prepared, and then reacted with a water-soluble sulfuric acid salt in an aqueous medium. This procedure gives basic aluminum sulfate in easily handlable forms different from conventional sols or gels.

It is also important for the objects of this invention to carry out the above reaction at a temperature lower than 90° C. At a reaction temperature of 90° C. or higher, sol- or gel-like basic aluminum sulfate will be formed.

The basic aluminum salts of formula (1) can be prepared by various methods. The most convenient method involves adding an alkali to an aqueous solution of an aluminum salt of a monovalent anion, for example aluminum chloride, aluminum nitrate, aluminum bromide, aluminum iodide, aluminum citrate and aluminum acetate, preferably aluminum chloride and aluminium nitrate, above all aluminum chloride. Sodium hydroxide, potassium hydroxide and ammonia are among examples of the alkali used. Advantageously, the alkali is added such that the mole ratio of OH to Al in the solution is from 0.5 to 2.55, preferably from 1.0 to 2.45. If the OH/Al mole ratio is below the lower limit specified, long periods of time are required in adding the soluble sulfuric acid in the subsequent operation, and moreover, the yield of basic aluminum sulfate becomes lower. If it exceeds the specified upper limit, the pH of the basic aluminum salt solution becomes higher, and undesirable phenomena are sometimes observed. For example, gel-like irregularly-shaped particles are formed as a by-product when the sulfate salt is added. Or in an extreme case, a gel-like precipitate forms before the addition of the sulfate salt. It is preferred that the alkali be added gradually with stirring so as to avoid gellation. If the rate of addition of the alkali is increased, the pH of the solution sometimes becomes higher locally to form a precipitate partly in the solution. If such a precipitate is formed, the stirring is performed for a sufficient period of time. This results in the re-dispersion of the precipitate to give a uniform solution. Even when no precipitate is formed, it is desirable to stir the solution continuously for a suitable period of time so as to stabilize the pH of the solution. Preferably, the basic aluminum salt solution is an aqueous solution as stated above, but it may additionally contain an organic solvent such as alcohol and acetone.

Advantageously, a soluble sulfate salt, such as sodium sulfate, potassium sulfate or ammonium sulfate, is added to the resulting basic aluminum salt solution so that the $SO_4/Al$ mole ratio becomes greater than $(3-c)/2$ [wherein c is as defined with regard to general formula (1)], above all at least 10% greater than the $(3-c)/2$ value. By so doing, the filtrability of the resulting basic aluminum sulfate is improved, and the separation and washing of the basic aluminum sulfate precipitate become easy. If the $SO_4/Al$ mole ratio is $(3-c)/2$ or lower, the growth of the resulting basic aluminum sulfate particles is insufficient so that irregularly-shaped particles are formed as a by-product and the filtrability of the basic aluminum sulfate is reduced.

By varying the reaction conditions as described in detail hereinbelow, basic aluminum sulfate is obtained in various forms such as fibers, spheres, prisms and radially oriented particles.

According to one preferred embodiment of this invention, basic aluminum sulfate in the form of fibers represented by the general formula $$Al(OH)_a(SO_4)_b \cdot nH_2O \qquad (2\text{-}a)$$

wherein a, b and n are positive numbers satisfying $a+2b=3$, $2.32 \leq a < 2.44$, $0.28 < b \leq 0.34$ and $0 \leq n \leq 10$, is produced by adding a soluble sulfuric acid salt to a solution of a water-soluble basic aluminum salt of formula (1) in which c is in the range of from 0.5 to 1.9, at a temperature of less than 50° C. and at such a rate of addition that the time T in hours required for adding the sulfate salt until the mole ratio of $SO_4$ to Al reaches $(3-c)/2$ satisfies the expression $$T < -14c + 28 \qquad (3).$$

It is important in this embodiment that the c value in formula (1) should be adjusted to 0.5–1.9, especially 1.0–1.7. If the c value exceeds the specified upper limit, prismatic basic aluminum sulfate having a different composition is undesirably formed as a by-product in the production of the fibrous basic aluminum sulfate.

It is also important to add the soluble sulfate salt at such a rate of addition that the time T in hours required for adding it until the $SO_4/Al$ mole ratio reaches $(3-c)/2$ satisfies the expression $T < -14c + 28$, preferably both the expressions $T < -14c + 28$ and $T \geq 1.40$. When T is less than 1.40 hours, radial particles may sometimes be formed. Hence, in order to obtain fibrous basic aluminum sulfate selectively, it is desirable to operate with $T = 1.40$. The wording "the time in hours required for adding the sulfate salt until the $SO_4/Al$ mole ratio reaches $(3-c)/2$" does not mean that it is essential to add the sulfate salt such that the $SO_4/Al$ mole ratio reaches $(3-c)/2$ or greater. It means that even when the sulfate is added to such an extent that the $SO_4/Al$ mole ratio is less than $(3-c)/2$, the addition should be effected at such a rate that the time T which would be required if it were added until the $SO_4/Al$ mole ratio reaches $(3-c)/2$ satisfies $T < -14c + 28$, preferably both $T < -14c + 28$ and $T \geq 1.40$.

It is unexpected from the prior general technical knowledge that fibrous basic aluminum sulfate can be obtained efficiently by limiting the time T to the range defined by these expressions. This fact was discovered for the first time by the present inventors based on statistical results obtained by their repeated experiments. In the vicinity of the limits of T outside this range, fibrous basic aluminum sulfate cannot be obtained efficiently, and prismatic or radially oriented basic aluminum sulfate is also formed in admixture.

Within the above range, the yield of the product tends to increase as the value of c [as defined with regard to formula (1)] becomes larger.

Advantageously, the temperature of the basic aluminum salt solution to which the soluble sulfuric acid salt is to be added is less than 50° C., preferably not more than 40° C. but at least 10° C., preferably at least 20° C. By satisfying this temperature requirement, the basic aluminum sulfate contemplated by this invention can be obtained with good efficiency. If the temperature of the solution is higher than the above-specified upper limit, the product tends to lose its fibrous shape to form spherical fine particles. If, on the other hand, it is below the lower limit, radial particles tend to be formed. However, after all the sulfate has been added, the lowering of the temperature of the solution does not so much exert influences.

Under the conditions described hereinabove, the soluble sulfuric acid salt is added to the basic aluminum salt solution. Shortly after the addition of the sulfuric acid salt is started, the mixture begins to become turbid like a sol. The turbidity gradually increases and finally a milk-white suspension results. On standing, the milk-white suspension separates into a white precipitate and a supernatant liquid.

The white precipitate is the fibrous basic aluminum sulfate of this invention. It is separated by using known procedures such as centrifugal separation or filtration. As required, the precipitate is washed with water and/or an organic solvent such as alcohols, and dried. As a result, the by-product salt is removed, and fibrous basic aluminum sulfate in pure form is obtained.

When it is necessary to store the fibrous basic aluminum sulfate as a slurry without drying it, the slurry is desirably dispersed in a non-aqueous solvent during storage. This is because if the fibrous basic aluminum sulfate is suspended for long periods of time in water or the mother liquor, its fibrous configuration changes, and prismatic or tetrahedral particles tend to form. Dispersion of the fibrous basic aluminum sulfate in a nonaqueous solvent such as hexane may be effected, for example, by a method which comprises adding an anionic surface-active agent to the aqueous suspension of the fibrous basic aluminum sulfate to make the surface of the fibrous particles oleophilic, and then extracting it with the nonaqueous solvent.

A series of the above operations are carried out usually at room temperature.

According to another embodiment of this invention, spherical particles of basic aluminum sulfate represented by the general formula $$Al(OH)_a(SO_4)_b \cdot nH_2O \qquad (2\text{-}b)$$

wherein a, b and n are positive numbers satisfying $a+2b=3$, $2.30 \leq a \leq 2.50$, $0.25 \leq b \leq 0.35$ and $0 \leq n \leq 10$, are produced by adding a soluble sulfuric acid salt to a solution of the water-soluble basic aluminum salt while maintaining the temperature of the solution at 50° C. or higher but lower than 90° C.

It is important that in adding the soluble sulfuric acid salt, the temperature of the basic aluminum salt solution should be maintained at 50° C. or higher but lower than 90° C., preferably 55° C. or higher but lower than 80° C. If the temperature of the solution is below the specified lower limit, pillar-like or needle-like particles having a length of, for example, about 10 microns will be formed in addition to spherical particles. If the temperature of the solution exceeds the specified upper limit, a gel tends to form to reduce the filtrability of the precipitate.

As stated hereinabove, the soluble sulfate is generally added as an aqueous solution. Its temperature does not need to be always equal to the temperature of the basic aluminum salt solution. Addition of the sulfate having a lower temperature, for example room temperature, may sometimes result in a decrease in the temperature of the reaction mixture. In this case, care must be taken so that the temperature of the reaction mixture may not fall outside the above-specified range. For reducing the temperature variations of the reaction mixture after the addition of the soluble sulfate salt, it is desirable, although not essential, to heat the sulfate salt in advance to a temperature about the same as the temperature of the basic aluminum salt solution.

Preferably, the rate of adding the soluble sulfate salt is such that the time T in hours required for adding the soluble sulfate salt until the $SO_4/Al$ mole ratio reaches $(3-c)/2$ [wherein c is as defined with regard to general formula (1)] satisfies the expression $0.5 \leq T \leq 12$, especially $1 \leq T \leq 8$. If the time T is below the specified lower limit, the resulting basic aluminum sulfate has an increased particle diameter, and in some cases, prismatic particles having an average length of about 15 microns are formed. Generally, as the time T becomes longer, the particle diameter of the resulting spherical particles of basic aluminum sulfate tends to become smaller. But if T exceeds the specified upper limit, the filtrability of the resulting precipitate is reduced, and a gel may sometimes be formed partly.

Desirably, the addition of the sulfate is effected under such conditions that upon the completion of the addition of all of the soluble sulfate salt, the concentration of Al in the reaction mixture (suspension) is 0.01 to 0.2 mole/liter. Lower concentrations are disadvantageous for industrial production, and when the Al concentration is extremely low, a precipitate will sometimes not be formed. Conversely, when the Al concentration is too high, a gel tends to form readily.

The basic aluminum sulfate of the invention generally exhibits good filtrability despite the fact that it is in the form of fine spherical particles in which the primary particles have an average particle diameter on the order of submicrons. Hence, its filtering and washing operations can be performed comparatively easily. Moreover, the washing efficiency is good, and basic aluminum sulfate having a high purity can be obtained.

In performing such operations as centrifugal separation or filtration, it is not necessary to elevate the temperature of the reaction mixture, and these operations can be carried out at room temperature. When all of the soluble sulfate salt has been added, the spherical particles of basic aluminum sulfate of this invention and agglomerated masses of these particles are nearly completely formed, and it is sufficient that aging is performed generally for about 1 hour after the addition of the soluble sulfate salt. If the temperature of the suspension after the reaction is lowered, there is an observable tendency toward the ready formation of agglomerated masses of the spherical particles. However, even when such agglomerated masses are formed, they can frequently be re-dispersed into spherical particles of a submicron size by such a treatment as light pulverization.

According to still another embodiment of this invention, basic aluminum sulfate in the form of prisms represented by the general formula $$Al(OH)_a(SO_4)_b \cdot nH_2O \qquad (2\text{-}c)$$

wherein a, b and n are positive numbers satisfying $a+2b=3$, $2.44 \leq a \leq 2.56$, $0.22 \leq b \leq 0.28$ and $0 \leq n \leq 10$, is produced by adding a soluble sulfuric acid salt to a solution of the water-soluble basic aluminum salt at a temperature of less than 50° C. and at such a rate of addition that the time T in hours required for adding the sulfuric acid salt until the mole ratio of $SO_4$ to Al reaches $(3\text{-}c)/2$ satisifies the expressions $$T \geq -14c + 28 \qquad (4)$$

$$T \geq 1.50 \qquad (5)$$

simultaneously.

According to this embodiment, prismatic basic aluminum sulfate can be efficiently obtained by limiting the time T to the range defined by these two expressions. In the vicinity of the limits of T outside this range, prismatic particles cannot be efficiently obtained, and moreover, basic aluminum sulfate in fibrous or radial form is obtained in admixture.

Within the above-specified range, the yield of the product tends to increase as the value of c [as defined with regard to formula (1)] becomes larger.

The addition of the soluble sulfate salt is desirably effected at a temperature of less than 50° C., preferably not more than 40° C. By satisfying this temperature requirement, the prismatic basic aluminum sulfate contemplated by this invention can be obtained with good efficiency.

According to yet another embodiment of this invention, basic aluminum sulfate in the form of radial particles represented by the general formula $$Al(OH)_a(SO_4)_b \cdot nH_2O \quad (2\text{-d})$$

wherein a, b and n are positive numbers satisfying $a+2b=3$, $2.34 \leq a \leq 2.50$, $0.25 \leq b \leq 0.33$ and $0 \leq n \leq 10$, is produced by adding a soluble sulfuric acid salt to a solution of a water-soluble basic aluminum salt of general formula (1) in which c is in the range of from 1.89 to 2.55, at such a rate of addition that the time T, as defined hereinabove, satisfies the expression $$0 \leq T < 1.50 \quad (6)$$

and either one of the following expressions $$T \geq -14c + 28 \quad (4)$$

$$c \geq 1.90 \quad (7).$$

Some of the basic aluminum sulfate products obtained by this invention have a novel composition represented by the general formula $$Al(OH)_a(SO_4)_b \cdot nH_2O \quad (2\text{-e})$$

wherein a, b and n are positive numbers satisfying $a+2b=3$, $2.30 \leq a \leq 2.56$, $0.22 \leq b \leq 0.35$ and $0 \leq n \leq 10$.

In determining the composition of general formula (2-e), basic aluminum sulfate is first washed fully and as required, dried by a suitable means, followed by measuring its weight. It is then dissolved in an acid, and Al and $SO_4$ are quantitatively determined by a chemical analysis such as chelate titration. Since the b value can be calculated from the result of this analysis, the a value is then determined so as to satisfy $a+2b=3$. The reason for using this procedure is that the determination of OH is difficult and it is usual practice to determine coefficients of a general formula in such a way as to maintain electrical neutrality. When the a and b values are obtained as above, the amount of $Al(OH)_a(SO_4)_b$ can be calculated. The calculated value is multiplied by the concentration of Al in the sample, and the product is subtracted from the initially measured weight of the sample. Since the balance corresponds to $nH_2O$, n can be determined by simple calculation.

The n value generally varies considerably depending upon the dried state of basic aluminum sulfate. For example, when water still appears on the surface of the basic aluminum sulfate after washing with water, n is 10 to 8, and when water is no longer seen to be present on the surface, n is 7 to 6. When the basic aluminum sulfate is further washed with ethanol after washing with water, n becomes about 2. When it is dried at 60° C. for 12 hours after washing with ethanol, n decreases to about 1. If the drying temperature is made higher and the drying time is made longer, the n value gradually becomes smaller. When the sample is dried at 150° C. for 2 hours, n becomes nearly 0.

The $nH_2O$ is considered to be not mere adhering water, but a kind of water of crystallization similar to zeolitic water.

Basic aluminum sulfate most preferred for the objects of this invention has an a value of at least 2.32 but less than 2.44 and a b value of more than 0.28 but not exceeding 0.34 in general formula (2-e) and is in the form of fibers.

It is seen from FIGS. 1 to 4 that the above fibrous basic aluminum sulfate is in the form of fibers generally having a diameter of 0.1 to 0.5 micron, a length of 5 to 150 microns and an aspect ratio of at least 20 usually reaching several hundred, and sometimes partly includes a bundle-like form resulting from the combination of these fibrous particles.

Figure 5:
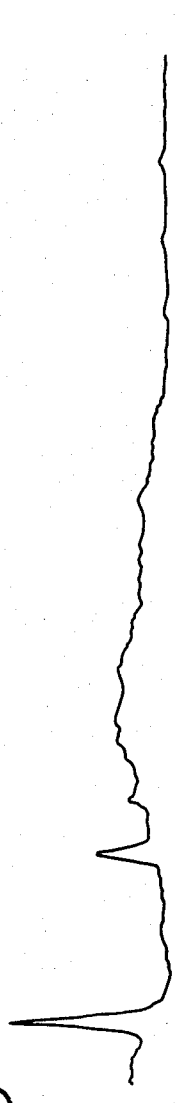
FIGS. 5 and 6 are X-ray diffraction patterns of the fibrous basic aluminum sulfate of this invention in a wet and a dry condition, respectively.

In an X-ray powder diffraction pattern (using $CuK_\alpha$ radiation) of the above fibrous basic aluminum sulfate of this invention, only weak broad diffraction peaks are observed at an angle $2\theta$ of about 7°–9° and about 18°–20°, and by analysis with X-rays, it has a very low crystallinity (see FIG. 5). But when, for example, a sample of the fibrous basic aluminum sulfate suspended in water is observed under a polarizing microscope, extinction occurs depending upon the direction of the polarizer. From this fact, the fibrous basic aluminum sulfate of this invention is considered to be essentially crystalline. It is presumed that the fibrous basic aluminum sulfate of this invention is an assembly of very fine crystalline fibrils, and the very small size of the fibrils broadens the X-ray diffraction peaks.

As is the case with conventional aluminum hydroxide, the fibrous basic aluminum sulfate of this invention is dehydrated and changes to alumina when it is calcined. Its fibrous form is retained, however. When it is calcined to 1000° C., fibrous $\gamma$-alumina is obtained, and calcination to 1200° C. gives fibrous $\alpha$-alumina. Since the strength of the fibers before the formation of $\alpha$-alumina is not so high, care needs to be taken during the calcination operation not to impart an external force tending to destroy the fibrous form.

The fibrous basic aluminum sulfate of the invention is effectively used not only in those fields in which conventional known basic aluminum sulfates or aluminum hydroxide are used, but also in quite new applications attributed to its unique properties. For example, it is formed into a sheet and used as a heat-resistant, chemical resistant filter or a filter-like catalyst carrier. The sheet can be easily produced by, for example, filtering a slurry of the fibrous basic aluminum sulfate of the invention or fibrous alumina obtained by calcining it. Furthermore, when it is used in the production of fiber-reinforced composite materials such as fiber-reinforced metals (FRM) or fiber-reinforced plastics (FRP), it gives a much greater reinforcing effect than conventional alumina fibers because of its very small fiber diameter and high aspect ratio. It is also very effective for improving thermal conductivity because alumina is a substance having high thermal conductivity.

The fibrous basic aluminum sulfate of the invention is in the form of short fibers. It can however be spun into long continuous fibers by a conventional spinning method. Since it consists of fibrous particles, it is easier to spin than an ordinary alumina powder, and its strength becomes higher.

In addition, by utilizing its shape anisotropy, the fibrous basic aluminum sulfate of the invention can also be used as a raw material for oriented sintered bodies of alumina or an orientation promoter for the production of the oriented sintered bodies. Accordingly, the present invention is of great industrial value.

The basic aluminum sulfate in another aspect of this invention has an a value of at least 2.30 and up to 2.50 and a b value of at least 0.25 and up to 0.35 in general formula (2-e) and is in the form of substantially spherical particles.

Figure 7:
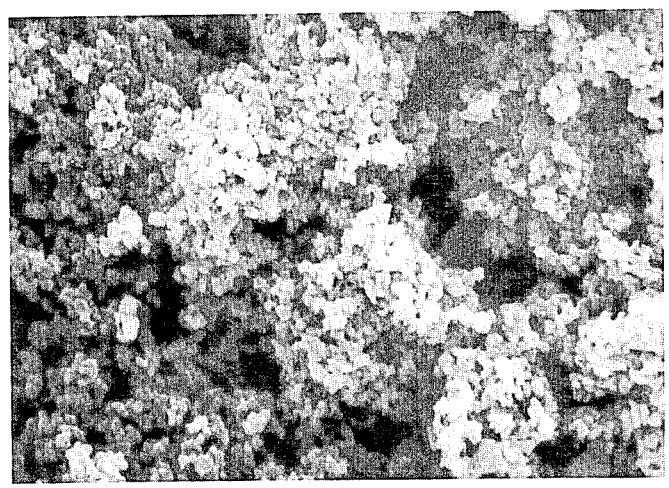
FIG. 7 is a scanning electron microphotograph (magnification 10,000×) of the spherical particles of basic aluminum sulfate obtained in Example 10 of this application.
Figure 11:
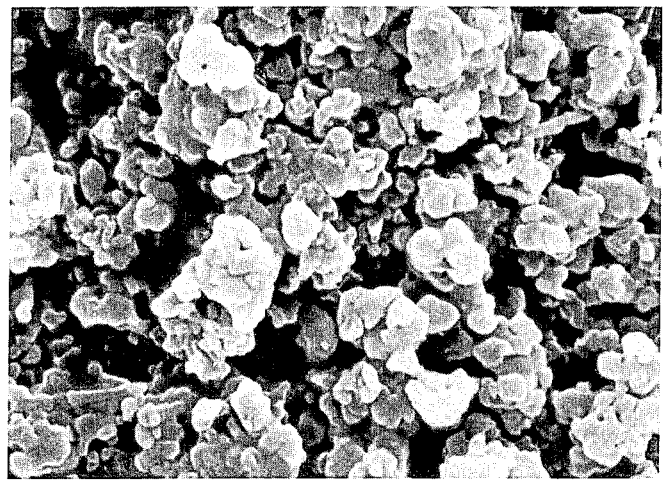
FIG. 11 is a scanning electron microphotograph (magnification 10,000×) of the spherical particles of basic aluminum sulfate obtained in Example 12 of this application.

This type of basic aluminum sulfate of the invention is nearly amorphous when examined by X-rays. But as shown in FIG. 7 or FIG. 11, its primary particles are spherical particles having a primary particle diameter of 0.1 to 1 micron, and have the excellent and novel property of showing a very sharp particle size distribution. Since it has good filtrability, it also has the advantage of being easily washed and obtained as a highly pure product.

This basic aluminum sulfate is spherical and sometimes slightly flattened. Secondary particles having an average particle diameter of 0.2 to 50 microns, above all about 10 microns, will sometimes be formed by the agglomeration of the primary particles. In such a case, too, it is frequently possible to re-disperse the agglomerated particles into particles of a submicron size by, for example, lightly pulverizing it.

Such a basic aluminum sulfate of this invention does not show a diffraction peak at $2\theta = 5°-70°$ in X-ray powder diffraction using $CuK_\alpha$ radiation, and can be considered as X-ray diffractometrically amorphous.

Figure 8:
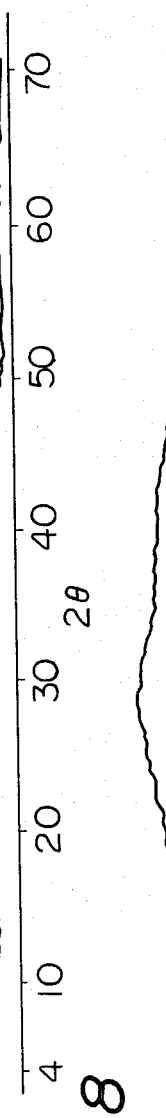
FIGS. 8 and 9 are X-ray powder diffraction patterns of the spherical particles of basic aluminum sulfate obtained in Example 10 of this application in a wet and a dry condition, respectively.
Figure 9:
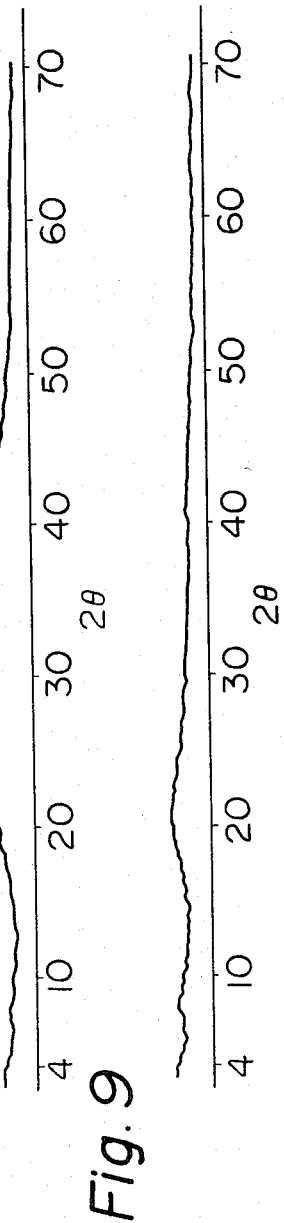

FIGS. 8 and 9 show X-ray powder diffraction patterns, determined by using $CuK_\alpha$ radiation, of the typical basic aluminum sulfate of this invention obtained in Example 10 given hereinbelow. FIG. 8 was obtained by using a sample before drying, and FIG. 9 was obtained by using a sample which was washed with ethanol and then dried at 60° C. for 12 hours. Both of these diffraction patterns have some haloes but no peak, and the samples are considered to have a very low crystallinity from the standpoint of X-ray diffractometry.

Figure 10:
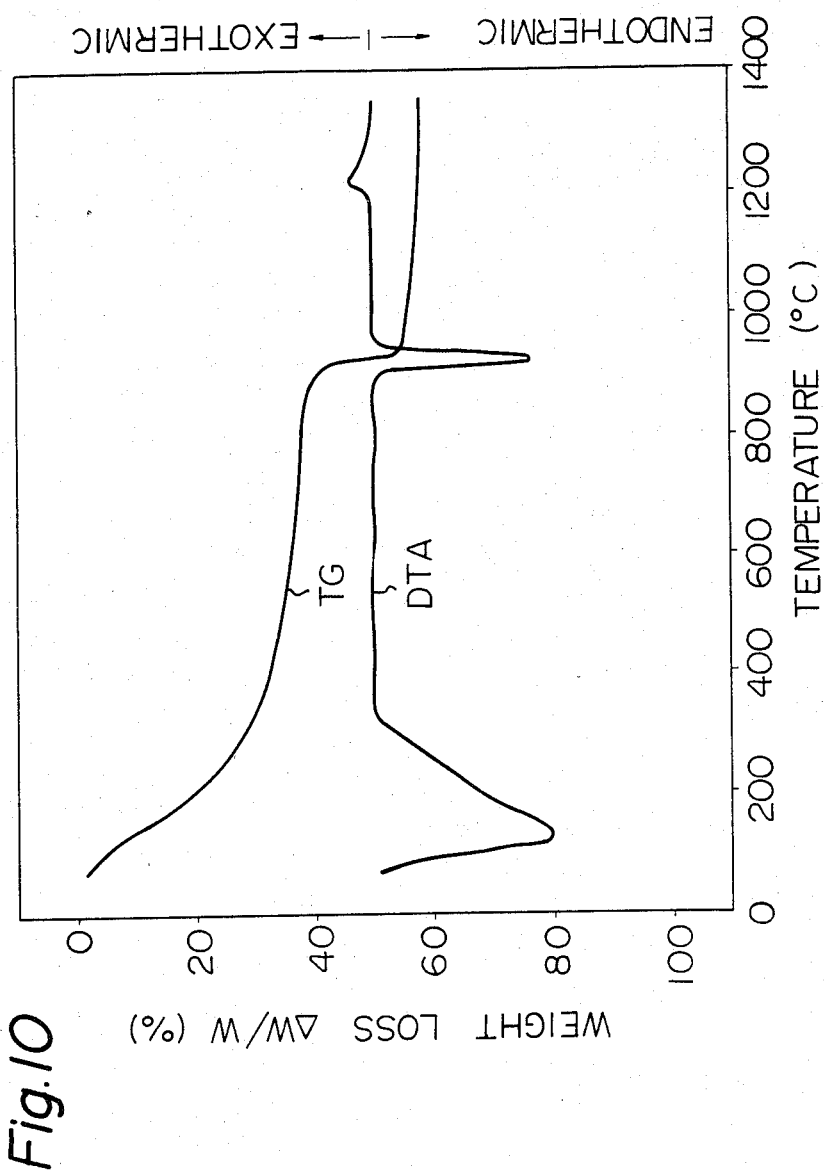
FIG. 10 shows DTA (differential thermal analysis) and TGA (thermogravimetric analysis) curves of the spherical particles of basic aluminum sulfate obtained in Example 10 of this application.

This type of basic aluminum sulfate of this invention, as conventional alumina hydrate, is dehydrated and changes to alumina when dehydrated by heating. FIG. 10 shows differential thermal analysis (DTA for short) and thermogravimetric analysis (TGA for short) curves of the typical basic aluminum sulfate of the invention obtained in Example 10 given hereinbelow. The results of DTA and TGA vary slightly depending upon the conditions for sample preparation, the drying conditions, etc. In the present case, the rate of temperature elevation is 10° C./min. With temperature elevation, a broad endothermic peak is observed up to about 300° C. This is due to the liberation of constitutional water and the hydroxyl groups, which is accompanied by a weight loss of about 35%. A relatively sharp endothermic peak at 900° to 930° C. is attributed to the liberation of a sulfuric acid radical as $SO_3$ gas which is accompanied by a weight loss of about 23%. Furthermore, with this peak as a boundary, the sample changes to $\gamma$-alumina. At 1180° to 1250° C., an exothermic peak due to the $\gamma$ to $\alpha$ phase transition is observed.

The changes of this type of basic aluminum sulfate of this invention upon heating are characterized by the fact that as compared with conventional general types of basic aluminum sulfate or aluminum hydroxide, the temperature of transition to $\gamma$-alumina is high and the transition takes place rapidly.

This type of basic aluminum sulfate of this invention has a specific surface area of generally 5 to 35 m²/g after it has been washed with ethanol and then dried at 60° C. for 24 hours; generally 20 to 60 m²/g after the dried product has been calcined at 1000° C. for 30 minutes; and generally 3 to 15 m²/g after the dried product has been calcined at 1200° C. for 30 minutes.

Furthermore, the basic aluminum sulfate of this invention exhibits unique chemical properties owing to the process of its formation.

Generally, conventional basic aluminum sulfate is formed by the hydrolysis of aluminum sulfate. This basic aluminum sulfate is considered to be of such a structure that $SO_4{}^{2-}$ ions are bonded to a shell of high molecules resulting from bridging of $Al^{3+}$ ions by $OH^-$ ions. Presumably for this reason, when the conventional basic aluminum sulfate is treated with a weak alkali, the $SO_4{}^{2-}$ ions are liberated from the shell, but in many cases, the original form of the basic aluminum sulfate is not destroyed.

However, when the spherical basic aluminum sulfate of this invention is made alkaline, its spherical particles are collapsed and usually dissolved or gelled. This is presumably because the basic aluminum sulfate of this invention is produced in such a form that polynuclear species resulting from the hydrolysis of an aluminum salt of a monovalent anion are bonded by $SO_4{}^{2-}$ ions exchanged with the monovalent anion. In other words, when the basic aluminum sulfate of this invention is treated with an alkali, the $SO_4{}^{2-}$ ions linking the polynuclear species are liberated. At this time, the polynuclear species separate from each other, and therefore, the shape of the particles is destroyed.

The spherical particles of the basic aluminum sulfate of this invention and their agglomerated masses are used very effectively in fields where the conventional types of basic aluminum sulfate or aluminum hydroxide are used. Since the basic aluminum sulfate of the invention has a smaller and more uniform particle diameter than the conventional basic aluminum sulfate or aluminum hydroxide, when it is used to fill a resin, etc., it has good dispersibility and can give a homogeneous filled resin composition. When the spherical particles of basic aluminum sulfate of this invention and their agglomerated masses are calcined, spherical particles of alumina and their agglomerated masses are obtained. Since they have excellent sinterability and are in the form of uniform spherical particles of a submicron size, these calcined products are useful as a raw material for sintered bodies or as a filler. In particular, since the basic aluminum sulfate of this invention is generally easy to wash, and is obtained as a highly pure product substantially free from an alkali, alumina obtained by calcining it also has a very high purity. There is a strong demand for spherical alumina having such a high purity and an average particle diameter on the order of submicrons in the production of light-transmitting alumina sintered bodies or monocrystal alumina. The basic aluminum sulfate of this invention can meet this demand.

According to still another embodiment of this invention, there is provided basic aluminum sulfate which has the composition represented by the general formula

$$Al(OH)_a(SO_4)_b \cdot nH_2O \qquad (2\text{-}c)$$

wherein a, b and n are positive numbers satisfying $a + 2b = 3$, $2.44 \leq a \leq 2.56$, $0.22 \leq b \leq 0.28$ and $0 \leq n \leq 10$, and which, when determined by an X-ray powder diffraction method using $CuK_\alpha$ radiation, shows a pair of diffraction peaks at $2\theta = 7.4°-8.2°$ and $9.0°-9.8°$ in the wet state and a diffraction peak at $2\theta =$ about 10° after dehydration at 150° C.

The composition of this basic aluminum sulfate is similar to those of the naturally occurring minerals mentioned hereinabove, but its X-ray diffraction pattern is quite different.

The structural difference between this type of basic aluminum sulfate of this invention and basaluminite becomes clearer when they are dehydrated by heating. After dehydration at 150° C., the latter shows new crystallinity as metabasaluminite. In contrast, after the same treatment, the former shows only a single diffraction peak at $2\theta$ = about 10° in X-ray powder diffraction using $CuK_\alpha$ radiation, and thus has very low crystallinity.

The basic aluminum sulfate of general formula (2-c) is generally in the form of prisms, basically either tetragonal or hexagonal prisms, or sometimes a combination of these prisms existing partly, which have a width and thickness each of 0.1 to 20 microns, a length of 1 to 150 microns, and an axial ratio, or the ratio of the length to the width or thickness, of from 2 to 50.

This prismatic basic aluminum sulfate shows the following results of X-ray diffraction.

FIGS. 13 to 20 show X-ray powder diffraction patterns, determined by using $CuK_\alpha$ radiation, of samples of the typical basic aluminum sulfate of the invention obtained in Example 19 given hereinbelow.

Figure 13:
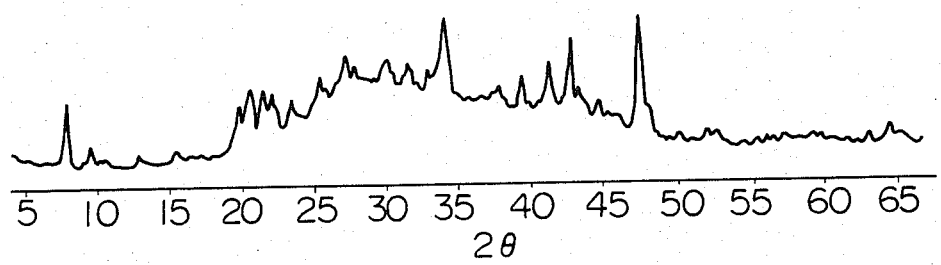
FIGS. 13 to 21 are X-ray diffraction patterns of samples of the prismatic basic aluminum sulfate obtained in Example 19 of this application.
Figure 14:
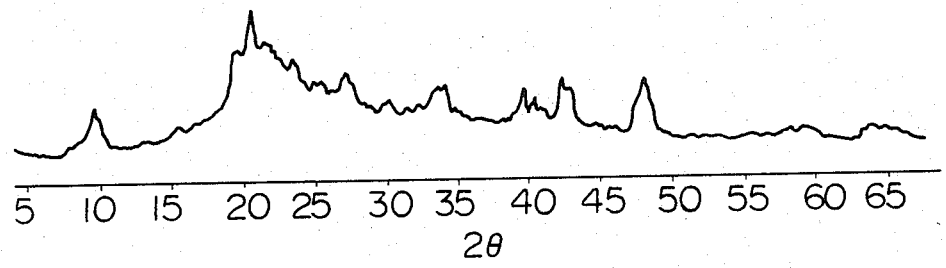
Figure 15:
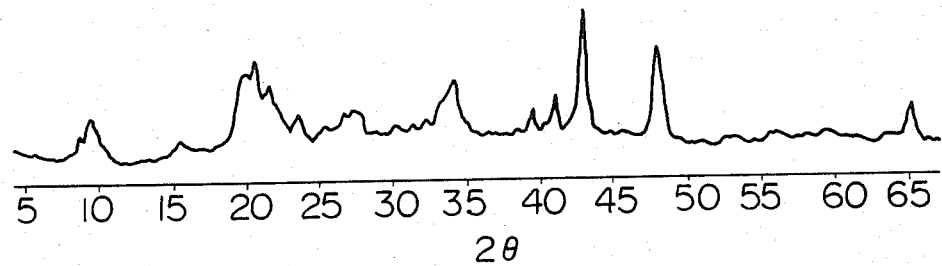
Figure 16:
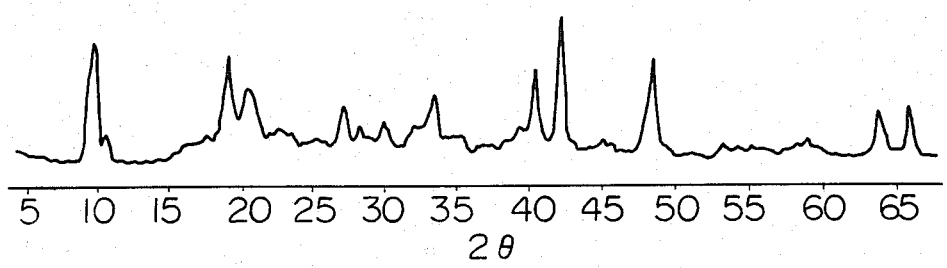
Figure 17:
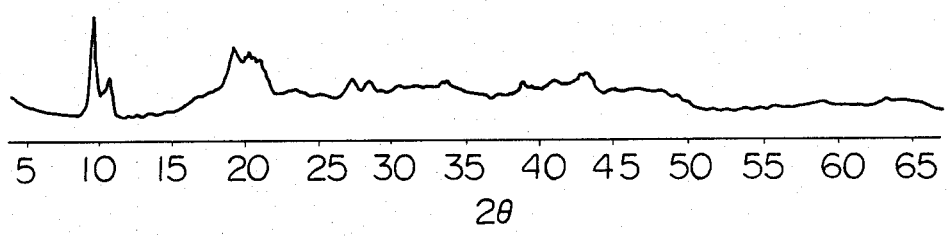
Figure 18:
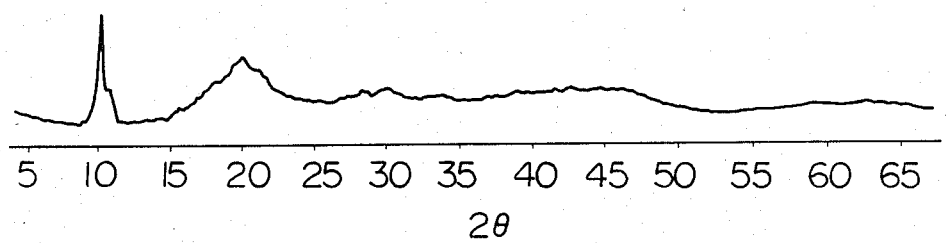
Figure 19:
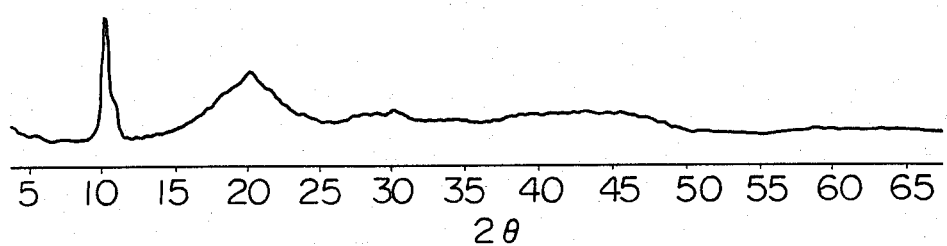
Figure 20:
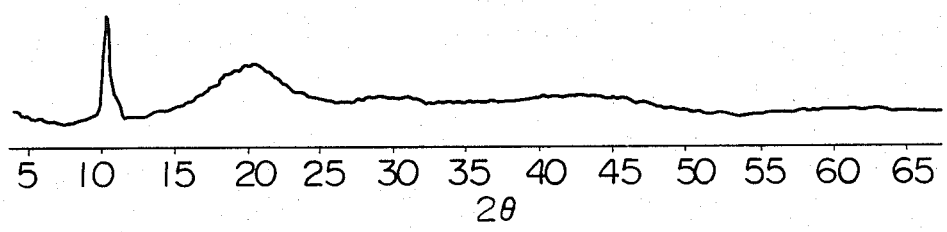

FIG. 13 was obtained by using an undried sample; and FIG. 14, by using a sample obtained by washing with water and then with ethanol followed by drying at 20° C. for 12 hours. FIG. 15, by using a sample dried at 30° C. for 2 hours; FIG. 16, by using a sample dried at 60° C. for 2 hours; FIG. 17, by using a sample dried at 80° C. for 2 hours; FIG. 18, by using a sample dried at 100° C. for 2 hours; FIG. 19, by using a sample dried at 120° C. for 2 hours; and FIG. 20, by using a sample dried at 150° C. for 2 hours, all being dried after washing with water and then with ethanol.

Figure 21:
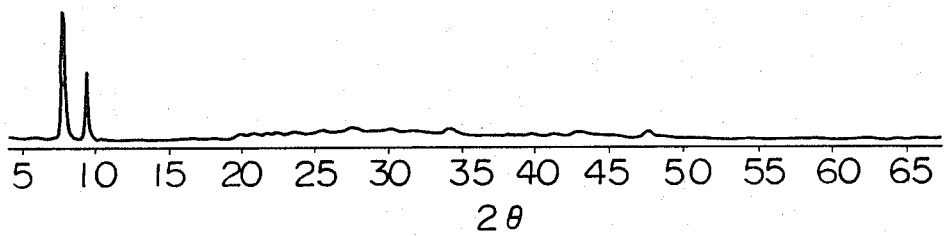

These X-ray diffraction patterns can be divided roughly into three groups. A first group is that of the undried sample shown in FIG. 13 which shows a pair of characteristic peaks at $2\theta = 7.4°-8.2°$ and $9.0°-9.8°$ and other peaks at $2\theta = 47.0°-47.8°$, and $33.4°-34.2°$. The X-ray diffraction pattern of the first group is also characterized by the fact that when it is determined while the long-axis directions of the prismatic particles are oriented parallel to the surface of a diffraction sample plate, the diffractions peaks appearing at $2\theta = 7.4°-8.2°$ and $9.0°-9.8°$ have much stronger diffraction intensities than the other peaks as shown in FIG. 21.

A second group includes those shown in FIGS. 14 to 16 which have peaks of strong diffraction intensities at $2\theta = 41°-43°$ and $47°-49°$ and a group of slightly broad peaks at $2\theta = 15°-25°$, and also peaks at $2\theta = 8°-10°$ having irregularly varying shapes depending upon the drying temperature.

A third group includes those shown in FIGS. 17 to 20 which have a single peak of strong diffraction intensity at $2\theta$ = about 10° and a very broad peak at $2\theta$ = about 20°.

Such variations of the X-ray diffraction patterns are not limited to the basic aluminum sulfate obtained in Example 19, and the same results are observed with basic aluminum sulfate samples obtained in the other embodiments of this invention.

When the basic aluminum sulfate once dried is again dispersed in water, the X-ray diffraction pattern of the dispersed basic aluminum sulfate is basically the same as that obtained in the wet state before the drying. Thus, one of the great characteristics of the basic aluminum sulfate of this invention is that this water regaining phenomenon is reversibly repeated in general so long as the drying temperature is maintained at not more than 150° C. It is presumed from this that even if there is some variation in the X-ray diffraction pattern depending upon drying, the crystal structure of the basic aluminum sulfate of the invention does not basically change.

Thus, the basic aluminum sulfate of this invention is basically crystalline. But as the n value in the general formulae representing its composition decreases, the crystallinity decreases and the X-ray diffraction pattern changes. The reason for these phenomena is not clear, but the present inventors theorize as follows: The basic aluminum sulfate of this invention has a layer-like structure in which the presence of water between layers maintains the interlayer distance constant and makes the vertical alignment of the layers regular. When the water between layers begins to escape as a result of drying, the interlayer distance cannot be maintained sufficient, and a distortion occurs in the vertical alignment of the layers, resulting in a disorder in structural regularity. Consequently, the crystallinity of the basic aluminum sulfate is reduced.

The prismatic basic aluminum sulfate of this invention, as the conventional aluminum hydroxide, is dehydrated and changes to alumina when it is calcined. But the shape of the prisms is retained. When it is calcined to 1000° C., prismatic $\gamma$-alumina is obtained, and calcination to 1200° C. gives prismatic $\alpha$-alumina.

The prismatic basic aluminum sulfate of this invention can be used effectively not only in fields where conventional known types of basic aluminum sulfate and aluminum hydroxide are used, but also in quite new applications attributed to its unique properties. For example, it is useful as a raw material for oriented sintered bodies of alumina or as an orientation promoter for the production of oriented molded articles, or as a filler in composite materials. Furthermore, because of its low specific area, it is also effective as a filler or as a carrier of an oxidation catalyst having mild activity or as a raw material for it.

Furthermore, since the prismatic basic aluminum sulfate of this invention is easy to wash and is obtained as a highly pure product substantially free from an alkali, it is also suitable as a raw material for conventional high purity alumina. In addition, because the prismatic basic aluminum sulfate rapidly transforms into $\gamma$-alumina or $\alpha$-alumina at lower calcining temperatures than conventional aluminum hydroxide, the great amount of energy can be saved, and this is industrially very beneficial.

The present invention further provides basic aluminum sulfate having the composition of general formula (2-d) and being in the form of radially oriented particles. This type of basic aluminum sulfate is in a radial form, as a sea urchin shell, a chestnut bur or a pinecone, with a particle diameter of 10 to 50 microns resulting from the coalescing of pillar-like or plate-like particles generally having a width of 0.2 to 4 microns and a length of 5 to 25 microns.

In an X-ray powder diffraction measurement using $CuK_\alpha$ radiation, this radidal basic aluminum sulfate of the invention shows a slightly strong peak at $2\theta$ = about 8° and a group of three fairly broad peaks at $2\theta = 18°-24°$, and otherwise exhibits scarcely any peaks. Thus, by an X-ray analysis, it has very low crystallinity.

When the radial basic aluminum sulfate of this invention is washed with water and then with ethanol and dried at 60° C. for 12 hours, the diffraction peak at $2\theta$=about 8° also becomes broad and its crystallinity further decreases. However, when the sample dried at 60° C. for 12 hours is again wetted with water, its X-ray powder diffraction pattern becomes basically the same as that of the undried sample. One great characteristic of the basic aluminum sulfate of the invention is that this water retaining phenomenon is repeated reversibly as long as the drying temperature is maintained generally at not more than 150° C.

When the radial basic aluminum sulfate of this invention is calcined, it is dehydrated and changes to alumina as the conventional aluminum hydroxide. But the radial form is retained. When it is calcined to 1000° C., radial $\gamma$-alumina is obtained, and calcination to 1200° C. gives radial $\alpha$-alumina.

By utilizing its bulky nature, the radial basic aluminum sulfate is useful as a heat insulating agent and a liquid-absorbing substance.

The following examples illustrate the present invention more specifically.

EXAMPLE 1

Four hundred milliliters of a 0.5N aqueous solution of $AlCl_3$ was put in a glass beaker and stirred by a magnetic stirrer. Then, 200 ml of a 0.5 aqueous solution of sodium hydroxide was added to the solution at a rate of 1 ml/min. by means of a microtube pump.

Since the solution at this time was strongly alkaline, the pH of the solution rose locally to induce a heterogeneous reaction, and a small amount of a gel-like precipitate was formed. Hence, the mixture was continuously stirred for 12 hours after the addition of the 0.5N aqueous solution of sodium hydroxide. As a result, the small amount of the gel-like precipitate was again dispersed to give a colorless clear aqueous solution of basic aluminum chloride theoretically represented by the general formula $Al(OH)_{1.50}Cl_{1.50}$. The solution had a pH of 3.86.

The above and subsequent reactions were both carried out at a liquid temperature of 20° C.

While 600 ml of the resulting aqueous solution of basic aluminum chloride was stirred, 520 ml of a 0.25N aqueous solution of $Na_2SO_4$ was added at a rate of 2.0 ml/min. by means of a microtube pump.

After about 1 hour and 20 minutes from the starting of the addition of the 0.25N aqueous solution of $Na_2SO_4$, a precipitate began to form. After 4 hours and 20 minutes when the addition of all the sodium sulfate solution was over, the mixture became milk-white. When the stirring was stopped and the mixture was left to stand, it separated into a white precipitate and a supernatant liquid.

Examination of the milk-white suspension under an optical microscope led to the determination that as shown in FIG. 1, innumerable fibrous particles having an average length of about 50 $\mu$m were formed.

The resulting suspension containing the fibrous particles was further stirred for about 3 hours, and then suction-filtered by using a No. 50 filter paper to separate the precipitate. The filtration cake was sheet-like and had a low bulk, and fine crepe-like wrinkles occurred on its surface.

Figure 2:
FIGS. 2, 3 and 4 are scanning electron microphotographs (magnification 2,000×) of the dried sheet-like materials of basic aluminum sulfate obtained respectively in Examples 1, 7 and 9 of this application.
Figure 3:
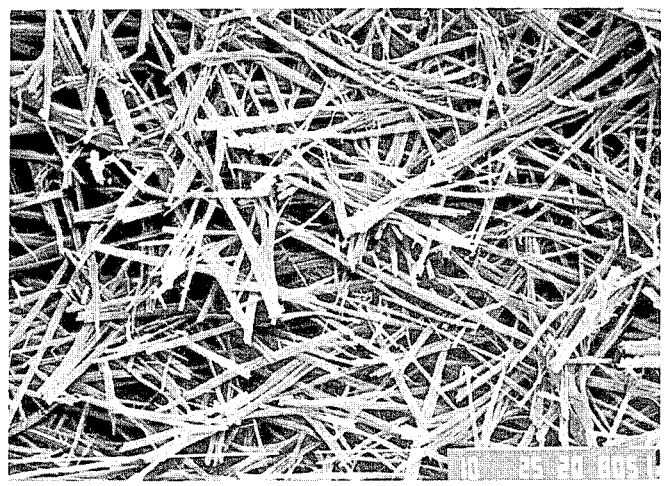
Figure 4:
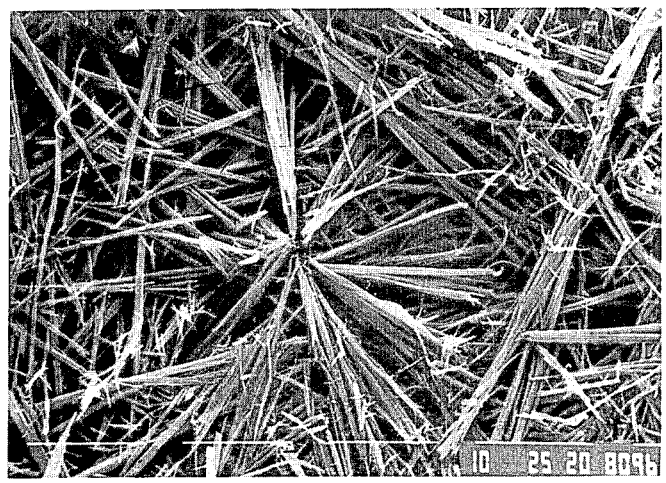

Subsequently, the filtration cake was washed with about 500 ml of distilled water and further with ethanol, and finally dried at 60° C. for 24 hours to give 3.57 g of a sheet-like material of fibrous basic aluminum sulfate. Examination of the resulting white sheet under a scanning electron microscope led to the determination that fibrous particles lay one upon another to assume a state similar to that in a nonwoven fabric. The fibrous particles had a width and a length nearly within the range of 0.1 to 0.3 $\mu$m, and 40 to 70 $\mu$m, respectively. A scanning electron microphotograph, taken at a magnification of 2,000X, of the sheet-like product is shown in FIG. 2.

Chemical analysis showed that the dried sheet-like cake contained 24.2% of Al and 25.4% of $SO_4$.

From the results obtained, the basic aluminum sulfate obtained by this example was considered to have the composition represented by the general formula $Al(OH)_{2.40}(SO_4)_{0.30}.0.85H_2O$.

Presumably because of insufficient washing, about 100 ppm of Na was detected. But the contents of other metal elements were each less than 100 ppm.

The yield of the product calculated as the ratio of recovery of Al was 48%.

Figure 6:
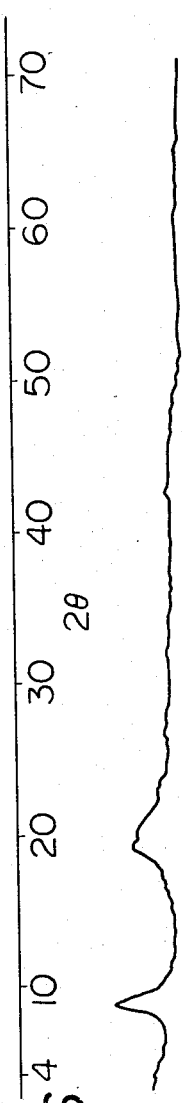

The results of X-ray powder diffraction using $CuK_\alpha$ radiation (40 KV, 120 mA) are shown in FIGS. 5 and 6. FIG. 5 was obtained by using a wet sample obtained by simply washing the filtration cake with distilled water, and FIG. 6 was obtained by using a sample obtained by washing the filtration cake with water and then with ethanol and drying it at 60° C. for 12 hours. Scarcely any peak was seen with the dried sample, and in the case of the wet sample, only weak broad peaks were seen at $2\theta$=about 7°–9° and 18°–20°.

The sample obtained by drying at 60° C. for 24 hours after washing with ethanol had a specific surface area, measured by rapid surface area measuring instrument (model SA-1000 made by Shibata Chemical Machinery Industry Co., Ltd.), of 21 $m^2/g$. From the measured value of specific surface area, it was presumed that the fibrous particles having a width of 0.1 to 0.3 $\mu$m obtained in this example were an assembly of ultrafine fibrils having a diameter of about 55 m$\mu$.

It was ascertained from X-ray powder diffraction patterns that when the fibrous basic aluminum sulfate obtained by this example was calcined in an electric furnace, it changed to $\gamma$-alumina at 1000° C., and $\alpha$-alumina at 1200° C. Observation under a scanning electron microscope showed that even after the basic aluminum sulfate changed to $\gamma$-alumina by calcination at 1000° C. for 30 minutes, its fibrous form was scarcely destroyed. It was also found that when it was changed to $\alpha$-alumina by calcination to 1200° C. for 30 minutes, the surfaces of the fibrous particles became uneven, but the fibrous form of the particles as a whole was still retained.

At this time, $\gamma$-alumina had a specific surface area of 70 $m^2/g$ and $\alpha$-alumina had a specific surface area of 19 $m^2/g$.

The fibrous basic aluminum sulfate in sheet from obtained as above was calcined at 1200° C. for 30 minutes to obtain a sheet composed of polycrystalline alumina fibers with 99.99% of $Al_2O_3$. As a result of observation under a scanning electron microscope, the alumina fibers were found to have an average diameter of about 0.1 to about 0.2 micron and an average length of about 60 to about 70 microns, and showed the diffraction pattern of $\alpha$-alumina in its X-ray diffraction analysis. A plurality of such alumina fiber sheets were impregnated with an epoxy resin solution consisting of 100 parts by weight of an epoxy resin (Epikote 1001-B-80, a trademark for a product of Shell Chemical; containing 20% by weight of methyl ethyl ketone as a solvent), a curing agent (4 parts by weight of dicyandiamide and 0.2 part of benzyldimethylamine) and a solvent (75 parts by weight of acetone and 10 parts by weight of water), dried at 80° C. for 30 minutes, and then further dried at 160° C. for 5 minutes to form prepreg sheets. Eight prepreg sheets were laminated, hot-pressed for 30 minutes at a temperature of 160° C. and a pressure of 100 kg/cm$^2$, and further heat-treated at 180° C. for 1 hour to cure the resin. Thus, a flat plate having a thickness of 1.2 mm and an alumina fiber filling ratio of 50% by weight (designated "flat plate A") was obtained.

Sheets of polycrystalline alumina fibers with 99.99% of Al$_2$O$_3$ were produced in the same way as above except that the calcination was carried out at 1000° C. for 1 hour instead of employing a calcination temperature of 1200° C. The alumina fibers showed nearly the same form as in the case of calcination at 1200° C., but had the diffraction pattern of γ-alumina in their X-ray diffraction analysis. By using the resulting sheets as base materials, a flat plate B having a thickness of 1.2 mm and an alumina fiber filling ratio of 50% by weight was produced in the same way as above.

The properties of these flat plates were measured, and the results are shown in Table 1.

TABLE 1

| Test items | Sample | |
|---|---|---|
| | Flat plate A | Flat plate B |
| Fiber filling ratio (wt. %) | 50 | 50 |
| Thermal conductivity at 20° C. (Kcal/m · hr · K) | 0.53 | 0.46 |
| Electric volume resistivity (normal condition) (ohms · cm) | 5 × 10$^{14}$ | 3.5 × 10$^{14}$ |
| Tensile modulus (25° C.) (dynes/cm$^2$) | 7 × 10$^{10}$ | 6 × 10$^{10}$ |
| Punching processability | Good | Good |

COMPARATIVE EXAMPLE 1

Four hundred milliliters of a 0.5N aqueous solution of AlCl$_3$ was put in a glass beaker, and stirred by means of a magnetic stirrer. Then, 60 ml of a 0.5N aqueous solution of NH$_4$OH was added at a rate of 1 ml/min. by means of a microtube pump. When after the addition, the mixture was stirred for about 1 hour, a colorless, clear uniform solution having a pH of 3.66 was obtained. The resulting basic aluminum chloride was considered to have a composition theoretically represented by the general formula Al(OH)$_{0.45}$Cl$_{2.55}$.

While 460 ml of the resulting aqueous solution of basic aluminum chloride was stirred, 900 ml of a 0.25N aqueous solution of Na$_2$SO$_4$ was added at a rate of 3.4 ml/min. by means of a microtube pump. Even after all of the sodium sulfate was added, no formation of a precipitate was observed.

A 0.25N aqueous solution of sodium sulfate was further added, but no change occurred and it was impossible to obtain such fibrous basic aluminum sulfate as shown in Example 1.

All of the above reactions were carried out at a liquid temperature of 25° C.

EXAMPLES 2 TO 9

The procedure of Example 1 was followed except that the conditions were changed as shown in Table 2. The results are also shown in Table 2.

TABLE 2

| Example | 2 | 3 | 4 | 5 |
|---|---|---|---|---|
| Aluminum salt solution | N/2-AlCl$_3$ aq. soln. (400 ml) | Same as in Example 2 | N/2-Al(NO$_3$)$_3$ aq. soln. (400 ml) | Same as in Example 2 |
| Alkali solution | N/2-NH$_4$OH aq. soln. (200 ml) | N/2-NaOH aq. soln. (213 ml) | N/2-NH$_4$OH aq. soln. (133 ml) | N/2-KOH aq. soln. (80 ml) |
| Rate of adding the alkali soln. | 1 ml/min. | 1 ml/min. | 1 ml/min. | 1 ml/min. |
| Basic aluminum salt | Al(OH)$_{1.50}$Cl$_{1.50}$ (600 ml) | Al(OH)$_{1.60}$Cl$_{1.40}$ (613 ml) | Al(OH)$_{1.00}$(NO$_3$)$_{2.00}$ (533 ml) | Al(OH)$_{0.60}$Cl$_{2.40}$ (480 ml) |
| pH of the basic aluminum salt | 3.77 | 3.59 | 3.70 | 3.60 |
| Temperature of of the basic aluminum salt solution | 30° C. | 30° C. | 25° C. | 20° C. |
| Sulfate salt solution | N/4-Na$_2$SO$_4$ aq. soln. (520 ml) | N/4-Na$_2$SO$_4$ aq. soln. (500 ml) | N/4-Na$_2$SO$_4$ aq. soln. (700 ml) | N/4-Na$_2$SO$_4$ aq. soln. (850 ml) |
| Temperature of the sulfate soln. | 30° C. | 30° C. | 25° C. | 20° C. |
| Rate of addition of the sulfate soln. | 2.2 ml/min. | 2.1 ml/min. | 1.9 ml/min. | 1.8 ml/min. |
| Product | Fibrous particles with an average length of about 70 μm | Same fibrous particles as in Example 1 | Same fibrous particles as in Example 1 | Same fibrous particles as in Example 1 |
| Composition of the product | Al(OH)$_{2.40}$(SO$_4$)$_{0.30}$·0.81H$_2$O | Al(OH)$_{2.40}$(SO$_4$)$_{0.30}$·0.95H$_2$O | Al(OH)$_{2.40}$(SO$_4$)$_{0.30}$·0.92H$_2$O | Al(OH)$_{2.38}$(SO$_4$)$_{0.31}$·0.99H$_2$O |
| Amount of the product yielded | 3.60 g | 4.02 g | 1.93 g | 0.29 g |
| Yield | 49% | 53% | 26% | 3.8% |
| Remarks | Fiber length 50–100 μm; having the same properties as in Example 1 | Having the same properties as in Example 1 | Having the same properties as in Example 1 | Having the same properties as in Example 1 |

| Example | 6 | 7 | 8 | 9 |
|---|---|---|---|---|
| Aluminum salt solution | Same as in Example 2 | Same as in Example 2 | Same as in Example 2 | Same as in Example 2 |
| Alkali solution | N/2-NaOH aq. soln. (200 ml) | Same as in Example 6 | Same as in Example 6 | Same as in Example 6 |
| Rate of adding the alkali soln. | 1 ml/min. | 1 ml/min. | 1 ml/min. | 1 ml/min. |
| Basic aluminum salt | Al(OH)$_{1.50}$Cl$_{1.50}$ (600 ml) | Same as in Example 6 | Same as in Example 6 | Same as in Example 6 |
| pH of the basic aluminum salt | 3.86 | 3.86 | 4.15 | 3.86 |
| Temperature of the basic aluminum salt solution | 20° C. | 20° C. | 10° C. | 20° C. |
| Sulfate salt solution | N/4-(NH$_4$)$_2$SO$_4$ aq. soln. (520 ml) | N/4-Na$_2$SO$_4$ aq. soln. (260 ml) | Same as in Example 7 | Same as in Example 7 |

TABLE 2-continued

| | | | | |
|---|---|---|---|---|
| Temperature of the sulfate soln. | 20° C. | 20° C. | 10° C. | 20° C. |
| Rate of adding the sulfate soln. | 2.0 ml/min. | 2.0 ml/min. | 2.0 ml/min. | 6 ml/min. |
| Product | Same fibrous particles as in Example 1 | Outer shape of the fibrous particles slightly lost, and the particles partly coalesced (see FIG. 3) | Both fibrous particles having an average length of about 40 μm and radial particles having a diameter of 20 to 30 μm | Both the same fibrous particles as in Example 1 and sea urchin-like radial particles having a diameter of about 50 μm (see FIG. 4) |
| Composition of the product | $Al(OH)_{2.42}(SO_4)_{0.29}\cdot 0.92H_2O$ | $Al(OH)_{2.40}(SO_4)_{0.30}\cdot 0.87H_2O$ | $Al(OH)_{2.36}(SO_4)_{0.32}\cdot 0.91H_2O$ | $Al(OH)_{2.34}(SO_4)_{0.33}\cdot 1.04H_2O$ |
| Amount of the product yielded | 3.56 g | 3.48 g | 3.64 g | 3.65 g |
| Yield | 47% | 46% | 48% | 47% |
| Remarks | Having the same properties as in Example 1 | Poor filtrability; the sheet was not pliable | Mixture of fibrous and radial particles | Mixture of fibrous and radial particles |

EXAMPLE 10

Four hundred milliliters of a 0.5N aqueous solution of $AlCl_3$ was put in a glass beaker and stirred by a magnetic stirrer. Then, 200 ml of a 0.5N aqueous solution of NaOH was added at a rate of 1 ml/min. by means of a microtube pump. Since the mixture was strongly alkaline at this time, the pH rose locally and a heterogeneous reaction occurred yielding a small amount of a gel-like precipitate. Hence, after the addition of 0.5N NaOH, the mixture was stirred continuously for 12 hours. As a result, the small amount of the gel-like precipitate was again dispersed to give a colorless clear aqueous solution of basic aluminum chloride represented theoretically by the general formula $Al(OH)_{1.50}Cl_{1.50}$. The solution had a pH of 3.86.

The above reaction was carried out at a liquid temperature of 20° C.

Six hundred milliliters of the resulting aqueous solution of basic aluminum chloride was put in a jacketed flask, and heated at 60° C. With stirring, 520 ml of a 0.25N aqueous solution of $Na_2SO_4$ was added at a rate of 2.0 ml/min. by means of a microtube pump.

In about 1 hour after the starting of adding the 0.25N aqueous sodium sulfate solution, the mixture became slightly turbid, and in 1 hour and 20 minutes, it became whitely turbid like a starch gruel. At the end of 4 hours and 20 minutes when the addition of all of the sodium sulfate solution as over, the mixture became milk-white. The stirring was stopped and the resulting suspension was left to stand. Consequently, it separated relatively into a white precipitate having a low bulk and a supernatant liquid.

Examination under an optical microscope led to the determination that in the milk-white suspension, innumerable fine spherical particles having a diameter of about 0.2 μm were formed.

The temperature of the 0.25N aqueous solution of $Na_2SO_4$ was 20° C., but during its addition, the temperature of the reaction mixture was maintained at 58° to 60° C.

The suspension containing spherical particles obtained by the above procedure was stirred further for about 3 hours while maintaining the temperature at 60° C. Then, the heating was stopped, and the reaction solution was allowed to cool to about 30° C. After the temperature of the solution decreased, it was suction-filtered by using a No. 5c filter paper to separate the precipitate. The filtrability of the precipitate was very good, and the filtration cake was compact and looked like a powder of the starch of dogtooth violet.

Subsequently, the filtration cake was washed with about 500 ml of distilled water and then with ethanol, and finally dried at 60° C. for 24 hours to give a white dry cake of spherical particles of basic aluminum sulfate. The dry cake was solid but was easily disintegrated. When it was roughly divided, it became granular and was non-sticky. The weight of the dry cake was 4.38 g.

Examination of the resulting white powder under a scanning electron microscope led to the determination that the individual particles had a diameter of about 0.2 μm and were relatively uniform and spherical or nearly spherical. It was also found that the spherical particles were partly agglomerated like clusters of grape.

A scanning electron microphotograph of the spherical basic aluminum sulfate obtained as above, taken at a magnification of 10,000×, is shown in FIG. 7.

Chemical analysis showed that the white powder contained 22.3% of Al and 27.1% of $SO_4$.

From the results, the basic aluminum sulfate obtained in this example was considered to have the composition of the general formula $Al(OH)_{2.32}(SO_4)_{0.34}\cdot 1.21H_2O$.

The contents of Na, Cl and other metal elements were each less than 100 ppm.

The yield of the product calculated as the ratio of recovery of Al was 54%.

The results of X-ray powder diffraction of the product using $CuK_\alpha$ radiation (40 kV, 120 mA) are shown in FIGS. 8 and 9. FIG. 8 was obtained by using the filtration cake wet after washing with distilled water, and FIG. 9 was obtained by using a sample obtained by washing the filtration cake with water and then with ethanol and drying it at 60° C. for 12 hours. Both of these diffraction patterns showed no peak at $2\theta = 5°-70°$. Only some haloes existed in the vicinity of $2\theta = 30°$ in FIG. 8, and in the vicinity of $2\theta = 20°$ in FIG. 9.

When the sample used in obtaining FIG. 9 was again dispersed in water, and then subjected to X-ray powder diffraction, substantially the same X-ray diffraction pattern as in FIG. 8 was obtained.

The results of DTA and TGA of a sample obtained by washing the filtration cake with water and then with ethanol and drying at 60° C. for 24 hours are shown in FIG. 10. The rate of temperature elevation was 10° C./min. The broad endothermic peak appearing up to about 300° C. in the DTA curve was due to the liberation of constitutional water and the hydroxyl groups, which corresponded to a weight loss of about 35% by weight in TGA. The sharp endothermic peak in the vicinity of 930° C. in the DTA curve was attributed to the liberation of a sulfuric acid radical, which corresponded to a weight loss of about 23% in TGA. The exothermic peak in the vicinity of 1200° C. is considered to be due to the γ to α phase transition.

The basic aluminum sulfate obtained in this example was calcined for 30 minutes at 1000° and 1200° C., respectively, and subjected to X-ray powder diffraction. The former yielded the X-ray powder diffraction pattern of γ-alumina, and the latter, that of α-alumina. It was determined by a scanning electron microscope that the shape of the particles remained almost unchanged at this time.

The sample obtained by washing the filtration cake with water and then with ethanol and drying it at 60° C. for 24 hours and the samples obtained by calcination for 30 minutes at 1000° and 1200° C. respectively had a specific surface area, measured by a rapid surface area measuring instrument (SA-1000 made by Shibata Chemical Machinery Industry Co., Ltd.), of 18 m$^2$/g, 28 m$^2$/g, and 11 m$^2$/g, respectively.

With a view to examining the chemical properties of the basic aluminum sulfate obtained by this example, it was attempted to disperse the sample obtained by drying at 60° C. for 24 hours after washing with ethanol in a 0.25N aqueous solution of sodium hydroxide. But the sample became solidified, and could not be dispersed even by application of ultrasonic waves. Examination of the sample in this state under a scanning electron microscope showed that the spherical particles collapsed.

This was considered to be the reason why the sample became a gel. When a 0.25N aqueous solution was further added to this gel-like sample and the mixture was left to stand, the precipitate dissolved in about 1 hour and a clear solution formed.

The basic aluminum sulfate obtained by this example was calcined at 1200° C. for 30 minutes. In order to examine the sinterability of the resulting sample, the following experiment was conducted. Incidentally, this sample was determined to be α-alumina by X-ray powder diffraction.

First, the sample was monoaxially molded under a pressure of 200 kg/cm$^2$, and then pressed by a hydrostatic press under a pressure of 1000 kg/cm$^2$ to form a disk. It was calcined for 3 hours at 1400° C. and 1500° C., respectively, in air. The densities of the resulting sintered bodies were measured. The relative density of the sample calcined at 1400° C., based on the theoretical density, was 93.1%, and the relative density of the sample calcined at 1500° C., based on the theoretical density, was 93.6%.

EXAMPLES 11 TO 18

The same procedure as in Example 10 was followed except that the conditions were changed as shown in Table 3. The results are also shown in Table 3.

TABLE 3

| Example | 11 | 12 | 13 | 14 |
|---|---|---|---|---|
| Aluminum salt solution | N/2-AlCl$_3$ aq. soln. (400 ml) | Same as in Example 11 | Same as in Example 11 | N/2-Al(NO$_3$)$_3$ aq. soln. (400 ml) |
| Alkali solution | N/2-KOH aq. soln. (242 ml) | N/2-NH$_4$OH aq. soln. (267 ml) | N/2-NH$_4$OH aq. soln. (310 ml) | N/2-NaOH aq. soln. (133 ml) |
| Basic aluminum salt | Al(OH)$_{1.80}$Cl$_{1.20}$ (642 ml) | Al(OH)$_{2.00}$Cl$_{1.00}$ (667 ml) | Al(OH)$_{2.32}$Cl$_{2.68}$ (710 ml) | Al(OH)$_{1.00}$(NO$_3$)$_{2.00}$ (533 ml) |
| pH of the basic aluminum salt | 3.62 at 30° C. | 4.12 at 25° C. | 4.45 at 25° C. | 3.54 at 30° C. |
| Temperature of the basic aluminum salt soln. | 67–71° C. | 68–71° C. | 67–71° C. | 60° C. |
| Sulfate salt solution | N/4-K$_2$SO$_4$ aq. soln. (428 ml) | N/4-(NH$_4$)$_2$SO$_4$ aq. soln. (350 ml) | N/4-Na$_2$SO$_4$ aq. soln. (240 ml) | N/4-Na$_2$SO$_4$ aq. soln. (712 ml) |
| Temperature of the sulfate salt soln. | 30° C. | 25° C. | 25° C. | 60° C. |
| Rate of adding the sulfate salt soln. | 1.7 ml/min. | 1.5 ml/min. | 0.6 ml/min. | 2.5 ml/min. |
| Product | Same spherical particles as in Example 10; the diameter of primary particles 0.1–0.4 μm | Spherical particles with a primary particle diameter of about 0.5 μm; many secondary agglomerated particles with a size of about 4 μm. (see FIG. 11) | Spherical particles with a primary particle diameter of 0.2–0.6 μm; many secondary agglomerated particles with a size of 8–15 μm. | Spherical particles with a primary particle diameter |
| Composition of the product | Al(OH)$_{2.36}$(SO$_4$)$_{0.32}$·1.11H$_2$O | Al(OH)$_{2.38}$(SO$_4$)$_{0.31}$·0.99H$_2$O | Al(OH)$_{2.46}$(SO$_4$)$_{0.27}$·1.11H$_2$O | Al(OH)$_{2.32}$(SO$_4$)$_{0.34}$·1.05H$_2$O |
| Amount of the product yielded | 5.60 g | 6.28 g | 6.97 g | 2.32 g |
| Yield of the product | 71% | 82% | 91% | 28% |
| Specific surface area: | | | | |
| Dried at 60° C. | 28 m$^2$/g | 10 m$^2$/g | 9 m$^2$/g | 30 m$^2$/g |
| Calcined at 1000° C. | 32 m$^2$/g | 22 m$^2$/g | 25 m$^2$/g | 52 m$^2$/g |
| Calcined at 1200° C. | 12 m$^2$/g | 8 m$^2$/g | 8 m$^2$/g | 14 m$^2$/g |
| Remarks | Having the same properties as in Example 10 | Having the same properties as in Example 10 | Dry and crumbling powder; other properties were the same as in Example 10 | The dried cake solidified to a crisp mass; other properties were the same as in Example 10 |

| Example | 15 | 16 | 17 | 18 |
|---|---|---|---|---|
| Aluminum salt solution | N/2-AlCl$_3$ aq. soln. (400 ml) | Same as in Example 15 | Same as in Example 15 | Same as in Example 15 |
| Alkali solution | N/2-NH$_4$OH aq. soln. (267 ml) | Same as in Example 15 | N/2-NaOH aq. soln. (220 ml) | N/2-NH$_4$OH aq. soln. (267 ml) |
| Basic aluminum salt | Al(OH)$_{2.00}$Cl$_{1.00}$ (667 ml) | Same as in Example 15 | Al(OH)$_{1.50}$Cl$_{1.50}$ (600 ml) | Al(OH)$_{2.00}$Cl$_{1.00}$ (667 ml) |
| pH of the basic aluminum salt | 4.12 at 25° C. | 4.12 at 25° C. | 3.86 at 20° C. | 4.12 at 25° C. |
| Temperature of the | 70° C. | 70° C. | 50° C. | 80° C. |

TABLE 3-continued

| basic aluminum salt solution | | | | |
|---|---|---|---|---|
| Sulfate salt solution | N/4-(NH$_4$)$_2$SO$_4$ aq. soln. (350 ml) | Same as in Example 15 | N/4-Na$_2$SO$_4$ aq. soln. (520 ml) | N/4-(NH$_4$)$_2$SO$_4$ aq. soln. (350 ml) |
| Temperature of the sulfate salt solution | 25° C. | 70° C. | 20° C. | 25° C. |
| Rate of adding the sulfate salt solution | 1.0 ml/min. | 3.8 ml/min. | 2.0 ml/min. | 1.5 ml/min. |
| Product | Same spherical particles as in Example 10 | Spherical particles with a primary particle diameter of 0.4–0.8 μm | Spherical particles having a diameter of 0.1–0.2 μm, and as a by-product fibrous particles having a diameter of 0.2 μm and a length of about 10 μm | Spherical particles having a diameter of 0.1–0.2 μm, and as a by-product, irregularly-shaped gel |
| Composition of the product | Al(OH)$_{2.36}$(SO$_4$)$_{0.32}$·0.99H$_2$O | Al(OH)$_{2.48}$(SO$_4$)$_{0.26}$·1.04H$_2$O | Al(OH)$_{2.38}$(SO$_4$)$_{0.31}$·0.96H$_2$O | Al(OH)$_{2.48}$(SO$_4$)$_{0.26}$·1.07H$_2$O |
| Amount of the product yielded | 6.25 g | 5.98 g | 5.86 g | 5.98 g |
| Yield of the product | 81% | 79% | 77% | 79% |
| Specific surface area: | | | Not measured because the product was a mixture of the spherical and fibrous particles | Not measured because the product was a mixture of the spherical particles and the gel |
| Dried at 60° C. | 21 m$^2$/g | 5 m$^2$/g | | |
| Calcined at 1000° C. | 32 m$^2$/g | 18 m$^2$/g | | |
| Calcined at 1200° C. | 13 m$^2$/g | 6 m$^2$/g | | |
| Remarks | Properties were the same as in Example 10 | Dry and crumbling powder; the other properties were the same as in Example 10 | — | Very poor filtrability; the dried cake was very hard and slightly semi-transparent |

With a view to examining the sinterability of the sample obtained by calcining the basic aluminum sulfate obtained in Example 12 at 1200° C. for 30 minutes, the same sintering experiment as in Example 10 was carried out. It was found that the sample calcined at 1400° C. had a relative density, based on the theoretical density, of 89.9%, and the sample calcined at 1500° C. had a relative density, based on the theoretical density, of 93.0%.

EXAMPLE 19

Four hundred milliliters of a 0.5N aqueous solution of AlCl$_3$ was put in a glass beaker, and stirred by means of a magnetic stirrer. Then, 310 ml of a 0.4N aqueous solution of NH$_4$OH was added at a rate of 1 ml/min. by means of a microtube pump. After the addition, the mixture was stirred further for about 1 hour to give a colorless clear solution having a pH of 4.45. The resulting basic aluminum chloride was considered to have the composition represented theoretically by the general formula Al(OH)$_{2.32}$Cl$_{0.68}$.

The above and subsequent reactions were carried out at a liquid temperature of 25° C.

While 710 ml of the resulting aqueous solution of basic aluminum chloride was stirred, 240 ml of a 0.25N aqueous solution of Na$_2$SO$_4$ was added at a rate of 0.4 ml/min. by means of a microtube pump. In about 3 hours after the start of adding the 0.25N aqueous solution of Na$_2$SO$_4$, a precipitate began to form. At the end of 10 hours when the addition of all of the aqueous sodium sulfate solution was over, a milk-white suspension resulted. When the stirring was stopped, it separated into a white precipitate and a supernatant. Examination of the milk-white suspension under an optical microscope led to the determination that innumerable prismatic particles having an average width of 3 μm and a length of about 20 μm formed.

The resulting suspension containing the prismatic particles was further stirred continuously for about 12 hours, and then suction-filtered by means of a No. 5c filter paper to separate the precipitate.

The filtration cake was subsequently washed with about 500 ml of distilled water and then with ethanol, and finally dried at 60° C. for 24 hours to give 6.58 g of a white powder composed of prismatic particles of basic aluminum sulfate. Examination of the resulting white powder under a scanning electron microscope led to the determination that the individual particles were prismatic with most of them being tetragonal and some being hexagonal. These particles had a width and a thickness each of 0.2 to 5 μm, a length of 2.5 to 40 μm, and an axial ratio, or the ratio of the length to the width or thickness, of 3.2 to 26.

Figure 12:
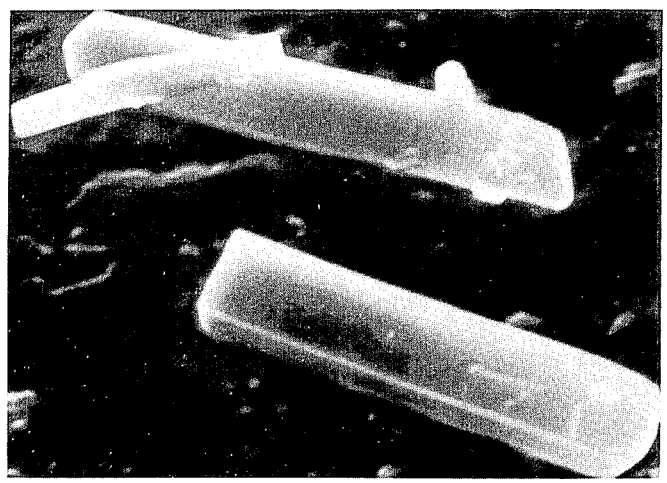
FIG. 12 is an electron microphotograph of the basic aluminum sulfate obtained in Example 19 of this application.

A scanning electron microphotograph, taken at a magnification of 5,000×, of the resulting product is shown in FIG. 12.

Chemical analysis showed that the white powder contained 24.7% of Al and 21.8% of SO$_4$.

From the results obtained, the basic aluminum sulfate obtained by this example was considered to have the composition represented by the general formula Al(OH)$_{2.50}$(SO$_4$)$_{0.25}$·0.92H$_2$O.

The contents of Na, Cl and other metal elements were each less than 100 ppm. The yield of the product calculated as the ratio of recovery of Al was 91%.

The results of X-ray powder diffraction of the product using CuK$_\alpha$ radiation (50 kV, 150 mA) are shown in FIGS. 13 to 20. FIG. 13 was obtained by using the filtration cake wet after washing with distilled water; FIG. 14, by using a sample obtained by washing the water-washed cake with ethanol and drying it at 20° C. for 12 hours; and FIGS. 15, 16, 17, 18, 19 and 20, by using samples obtained by drying the ethanol-washed sample for 2 hours at a temperature of 30°, 60°, 80°, 100°, 120°, and 150° C., respectively.

It was found from the results of the chemical analysis of these samples that the SO$_4$/Al mole ratio remained unchanged, and all of these samples can be expressed by the general formula Al(OH)$_{2.50}$(SO$_4$)$_{0.25}$·nH$_2$O. The n in the above formula was 9, 2.04, 1.34, 0.86, 0.55, 0.29, 0.13, and 0, respectively, for the samples of FIGS. 13 to 20.

When the samples of FIGS. 14 to 20 were again dispersed in water and then subjected to X-ray powder diffraction, the same X-ray diffraction pattern as in FIG. 13 was obtained in all cases.

When the wet sample was placed on a diffraction sample plate without pulverization and subjected to X-ray diffraction after giving it a light vibration to cause it to flow, namely by orienting it such that the long-axis direction of the prismatic particles was in parallel to the surface of the diffraction sample plate, it was noted that the relative intensities of only the two peaks at $2\theta = 7.4°-8.2°$ and $9.0°-9.8°$ increased to about 10 times. The results are shown in FIG. 21.

The specific surface area was measured by using a rapid surface area measuring instrument (model SA-1000 made by Shibata Chemical Machinery Industry Co., Ltd.). It was found that the sample obtained by washing with ethanol followed by drying at 60° C. or 24 hours had a specific surface area below the limit of measurement, i.e. below 1 m²/g.

It was determined by X-ray powder diffraction that when the prismatic basic aluminum sulfate obtained in this example was calcined, it changed to γ-alumina at 1000° C. and to α-alumina at 1200° C. Observation under a scanning electron microscope led to the determination that even after it was converted to γ-alumina by calcination at 1000° C. for 30 minutes, the prismatic shape of the product remained almost unchanged.

It was also found that when the basic aluminum sulfate was converted to α-alumina by calcination at 1200° C. for 30 minutes, innumerable fine pores formed in the particles, but the prismatic shape of the particles as a whole was retained. At this time, γ-alumina had a specific surface area of 80 m²/g, and α-alumina had a specific surface area of 25 m²/g.

EXAMPLE 20

While 710 ml of an aqueous solution of basic aluminum chloride obtained under the same conditions as in Example 19 was stirred, 150 ml of a 0.25N aqueous solution of Na$_2$SO$_4$ was added at a rate of 0.4 ml/min. by means of a microtube pump. When the resulting milk-white suspension was left to stand, the precipitate was more bulky than in Example 19, and the semidentation speed was slower.

The above suspension was further stirred for 12 hours and then suction-filtered by means of a No. 5c filter paper to separate the precipitate. The precipitate was washed and dried in the same way as in Example 19.

Since it had poor filtrability, long periods of time were required for the filtering and washing operations. Examination of the resulting white powder under a scanning electron microscope led to the determination that it was a mixture of the same prismatic basic aluminum sulfate as in Example 19 and a minor proportion of irregularly-shaped agglomerated particles.

Figure 22:
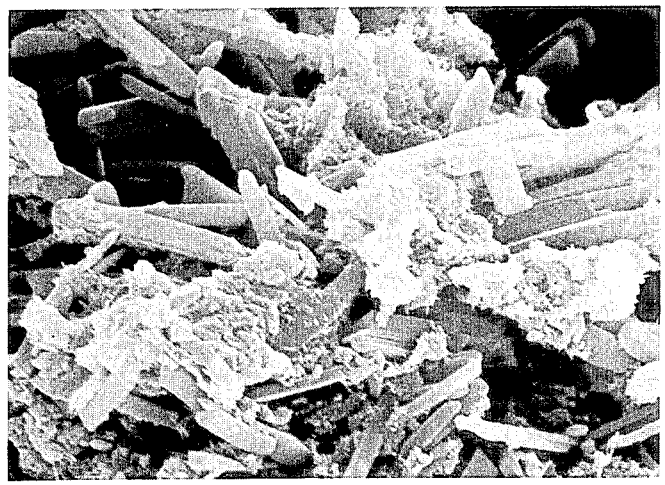
FIG. 22 is an electron microphotograph of the basic aluminum sulfate obtained in Example 20 of this application.

A scanning electron microphotograph, taken at a magnification of 5,000×, of the product is shown in FIG. 22.

EXAMPLES 21 TO 23

The same procedure as in Example 19 was followed except that the conditions were changed as shown in Table 4. The results are also shown in Table 4.

TABLE 4

| Example | 21 | 22 | 23 |
|---|---|---|---|
| Aluminum salt solution | N/2-AlCl$_3$ aq. soln. (400 ml) | Same as in Example 21 | 1N-Al(NO$_3$)$_3$ aq. sol. (300 ml) |
| Alkali solution | N/2-NaOH aq. soln. (200 ml) | N/2-NH$_4$OH aq. soln. (260 ml) | 1N-KOH aq. soln. (236 ml) |
| Rate of adding the alkali soln. | 1 ml/min. | 1 ml/min. | 0.5 ml/min. |
| Basic aluminum salt | Al(OH)$_{1.50}$Cl$_{1.50}$ (600 ml) | Al(OH)$_{1.95}$Cl$_{1.05}$ (660 ml) | Al(OH)$_{2.36}$(NO$_3$)$_{0.64}$ (536 ml) |
| pH of the basic Al salt | 3.86 | 4.10 | 4.57 |
| Temperature of the basic Al salt soln. | 20° C. | 25° C. | 25° C. |
| Sulfate salt solution | N/4-Na$_2$SO$_4$ aq. soln. (520 ml) | N/4-(NH$_4$)$_2$SO$_4$ aq. soln. (360 ml) | 1N-K$_2$SO$_4$ aq. sol. (80 ml) |
| Temperature of the sulfate salt solution | 20° C. | 25° C. | 25° C. |
| Rate of adding the sulfate salt solution | 0.4 ml/min. | 0.93 ml/min. | 0.4 ml/min. |
| Product | Prismatic particles having an average width of 3 μm and a length of 30 μm | Same prismatic particles as in Example 19 | Same prismatic particles as in Example 19 |
| Composition of the product | Al(OH)$_{2.50}$(SO$_4$)$_{0.25}$·0.83H$_2$O | Al(OH)$_{2.50}$(SO$_4$)$_{0.25}$·0.90H$_2$O | Al(OH)$_{2.50}$(SO$_4$)$_{0.25}$·0.85H$_2$O |
| Amount of the product yielded | 3.61 g | 5.50 g | 8.34 g |
| Yield of the product | 49.5% | 76% | 77% |
| Remarks | The properties were the same as in Example 19 | The properties were the same as in Example 19 | The properties were the same as in Example 19 |

EXAMPLE 24

Four hundred milliliters of a 0.5N aqueous solution of AlCl$_3$ was put in a glass beaker, and stirred by means of a magnetic stirrer. Then, 310 ml of a 0.5N aqueous solution of NH$_4$OH was added at a rate of 1 ml/min. by means of a microtube pump. After the addition, the mixture was further stirred for about 1 hour to give a colorless clear uniform solution having a pH of 4.45.

The resulting basic aluminum chloride was considered to have the composition represented theoretically by the general formula Al(OH)$_{2.32}$Cl$_{0.68}$.

The above and subsequent reactions were all carried out at a liquid temperature of 25° C.

While 710 ml of the resulting aqueous salt solution of basic aluminum chloride was stirred, 240 ml of a 0.25N aqueous solution of Na$_2$SO$_4$ was added at a rate of 2.2 ml/min. by means of a microtube pump. At the end of 1 hour and 50 minutes when 240 ml of the 0.25N aqueous sodium sulfate solution had been entirely added a milk-white suspension resulted. When the stirring was stopped, it separated into a white precipitate and a supernatant.

Examination of the milk-white suspension under an optical microscope led to the determination that both sea urchin-like radical particles having an average particle diameter of 30 μm and prismatic particles having an average width of 3 μm and a length of 20 μm formed innumerably.

The resulting suspension containing the radial particles and the prismatic particles was further stirred for about 12 hours, and then suction-filtered by means of a No. 5c filter paper to separate the precipitate.

The filtration cake was washed with about 500 ml of distilled water and further with ethanol, and finally dried at 60° C. for 24 hours. The resulting dry cake was very bulky, and although large cracks formed at several parts, it did not disintegrate. Hence, it was found to have excellent moldability. The weight of the dry cake was 6.60 g.

Examination of the resulting white cake under a scanning electron microscope led to the determination that plate-like particles having a width of about 0.5 to 3 μm and a length of about 5 to 15 microns coalsced to assume a radial form like a sea urchin or a pinecone. Simultaneously, prismatic particles having a width of about 1 to 5 μm and a length of about 5 to 30 μm could be detected, but many of them got out of shape.

Figure 23:
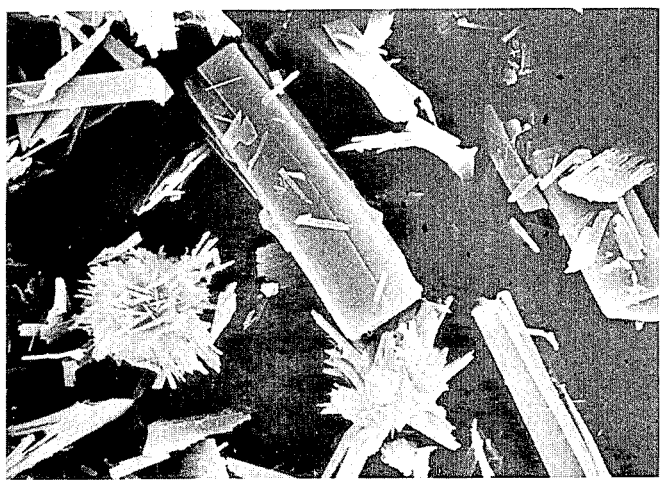
FIG. 23 is a scanning electron microphotograph (magnification 2,000×) of the dried cake of the radial particles of basic aluminum sulfate obtained in Example 24 of this application.

A scanning electron microphotograph, taken at a magnification of 2,000×, of the product is shown in FIG. 23.

Chemical analysis showed that the white cake contained 24.4% of Al and 23.6% of $SO_4$.

From the results obtained, the basic aluminum sulfate obtained in this example was considered to have the composition represented by the general formula $Al(OH)_{2.46}(SO_4)_{0.27}\cdot 0.88H_2O$.

The contents of Na, Cl and other metal elements were each less than 100 ppm.

The yield of the product calculated as the ratio of recovery of Al was 89%.

Figure 24:
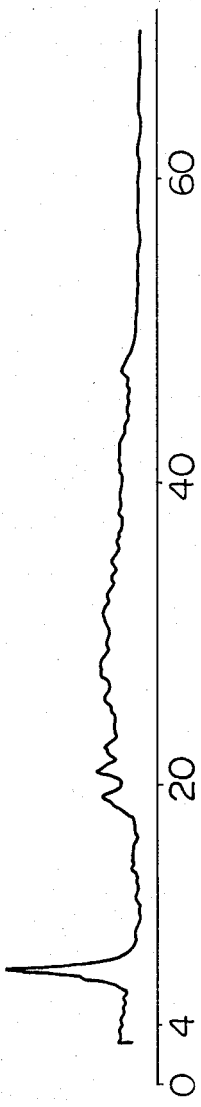
FIGS. 24 and 25 are X-ray powder diffraction patterns of the mixture of radial basic aluminum sulfate and prismatic basic aluminum sulfate obtained in Example 24 of this application in a wet and a dry condition, respectively.
Figure 25:
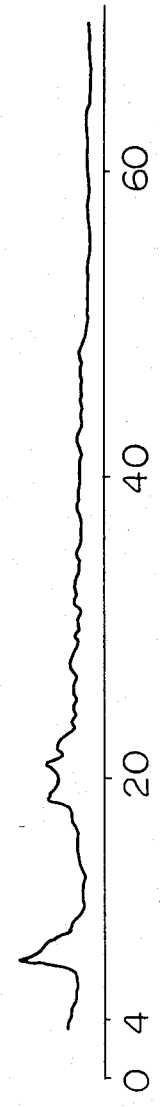

The results of X-ray powder diffraction using $CuK_\alpha$ radiation (40 kV, 120 mA) are shown in FIGS. 24 and 25.

FIG. 24 was obtained by using a wet sample obtained by washing the filtration cake with distilled water, and FIG. 25, by using a sample obtained by washing the sample of FIG. 24 with ethanol and drying it at 60° C. for 12 hours. The diffraction pattern of the wet sample showed a slightly strong peak at $2\theta =$ about 8° and a group of three fairly broad peaks at $2\theta = 18°-24°$ but scarcely any other peaks. In the diffraction pattern of the dry sample, the peak in the vicinity of about $2\theta = 8°$ was broad, showing reduced crystallinity. However, when the sample of FIG. 25 was again dispersed in water and subjected to X-ray powder diffraction in the wet state, basically the same diffraction pattern as in FIG. 24 was obtained.

From X-ray diffraction patterns, it was ascertained that when the radial basic aluminum sulfate obtained in this example was calcined, it changed to γ-alumina at 1000° and to α-alumina at 1200° C. It was found by observation under a scanning electron microscope that even after the calcination was performed for 30 minutes at 1000° or 1200° C., the shape of the particles was generally retained.

EXAMPLE 25

The same procedure as in Example 24 was followed except that while the aqueous solution of basic aluminum chloride was stirred, all the 0.25N aqueous solution of $Na_2SO_4$ was added at a time.

In 5 minutes after the addition of the 0.25N aqueous solution of $Na_2SO_4$, the mixture began to be turbid. When it was further stirred for about 12 hours, a milk-white suspension resulted.

Observation of the white suspension under a scanning electron microscope by the same method as in Example 24 led to the determination that the same radial particles as in Example 24 formed. Prismatic particles also formed as in Example 24, but there were great variations in size and their outer configuration was considerably destroyed.

Figure 26:
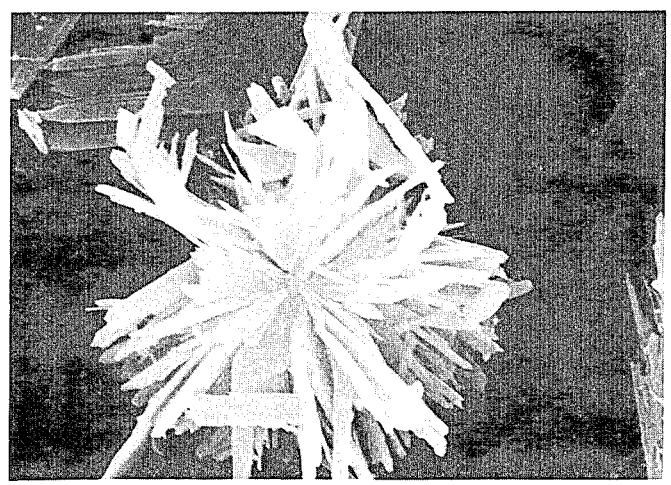
FIG. 26 is a scanning electron microphotograph (magnification 5,000×) of the dried cake of radial basic aluminum sulfate obtained in Example 25 of this application.

A scanning electron microphotograph, taken at a magnification of 5,000×, of the product is shown in FIG. 26.

Chemical analysis showed that the dry cake contained 24.1% of Al and 24.0% of $SO_4$.

From the results obtained, the basic aluminum sulfate obtained by this example was considered to have the composition of the general formula $Al(OH)_{2.44}(SO_4)_{0.28}\cdot 0.93H_2O$.

What we claim is:

1. A process for producing fibrous basic aluminum sulfate of the general formula $$Al(OH)_a(SO_4)_b\cdot nH_2O$$

wherein a, b and n are positive numbers satisfying $a+2b=3$, $2.32 \leq a < 2.44$, $0.28 < b \leq 0.34$ and $0 \leq n \leq 10$, which comprises adding a water-soluble sulfuric acid salt selected from the group consisting of alkali metal sulfates and ammonium sulfate to a solution of a water-soluble basic aluminum salt of the general formula $$Al(OH)_c X_d$$

wherein X represents a monovalent anion selected from the group consisting of chloride, nitrate, bromide, iodide, and acetate ions, c and d are positive numbers satisfying $c+d=3$ and c is within the range of from 0.5 to 1.9, at a temperature of less than 50° C. and at such a rate of addition that the time T in hours required for adding the sulfate salt until the mole ratio of $SO_4$ to Al reaches $(3-c)/2$ satisfies the expression $$T < -14c + 28.$$

2. The process of claim 1 wherein the addition of the soluble sulfuric acid salt is effected such that the time T also satisfies $T \geq 1.40$.

3. Basic aluminum sulfate in the form of fibers represented by the general formula $$Al(OH)_a(SO_4)_b\cdot nH_2O$$

wherein a, b and n are positive numbers satisfying $a+b=3$, $2.32 \leq a < 2.44$, $0.28 < b \leq 0.34$ and $0 \leq n \leq 10$, and having a diffraction peak at $2\theta = 7°-9°$ and $18°-20°$ in X-ray powder diffraction using $CuK_\alpha$ radiation.

4. The basic aluminum sulfate of claim 3 wherein said fibers have a diameter of 0.1 to 0.5 micron and a length of 5 to 150 microns.

5. The basic aluminum sulfate of claim 3 which, in the wet state, has substantially the same X-ray diffraction pattern as the X-ray diffraction pattern shown in FIG. 5.

* * * * *

UNITED STATES PATENT AND TRADEMARK OFFICE
CERTIFICATE OF CORRECTION

PATENT NO. : 4,526,772
DATED : July 2, 1985
INVENTOR(S) : Takada et al.

It is certified that error appears in the above-identified patent and that said Letters Patent is hereby corrected as shown below:

On the title page;
Assignee, delete "Suda", insert --Soda--.

Signed and Sealed this

Eighth Day of October 1985

[SEAL]

Attest:

DONALD J. QUIGG

Attesting Officer

Commissioner of Patents and Trademarks—Designate